United States Patent
Weaver et al.

(10) Patent No.: US 7,525,050 B1
(45) Date of Patent: Apr. 28, 2009

(54) INTERFERENCE REMOVAL IN POINTING DEVICE LOCATING SYSTEMS

(75) Inventors: Philip A. Weaver, Mountain View, CA (US); Xiang Zhu, San Mateo, CA (US)

(73) Assignee: Luidia, Inc., San Carlos, CA (US)

( * ) Notice: Subject to any disclaimer, the term of this patent is extended or adjusted under 35 U.S.C. 154(b) by 573 days.

(21) Appl. No.: 11/038,991

(22) Filed: Jan. 20, 2005

Related U.S. Application Data

(60) Provisional application No. 60/564,909, filed on Apr. 23, 2004.

(51) Int. Cl.
  *G06F 3/043* (2006.01)
  *G06F 3/033* (2006.01)
(52) U.S. Cl. .................. 178/18.04; 345/179; 702/56
(58) Field of Classification Search ............ 178/18.04, 178/19.06, 20.04, 19.07; 345/179–183; 702/56
  See application file for complete search history.

(56) References Cited

U.S. PATENT DOCUMENTS 4,723,299 A * 2/1988 Kobayashi ............... 178/20.02
6,922,642 B2 * 7/2005 Sullivan ..................... 702/56

* cited by examiner

*Primary Examiner*—Kevin M Nguyen
(74) *Attorney, Agent, or Firm*—Dov Rosenfeld; Inventek

(57) ABSTRACT

An apparatus and a method for determining the location of a pointing device in the vicinity of a set of receivers able to receive one or more locating signals transmitted through a medium. The method includes receiving at a receiver a signal that includes a locating signal and an interfering signal, determining an estimated interference signal indicative of the interfering signal included in the signal received, determining a signal indicative of the difference between the received signal and the estimated interference signal, and using the signal indicative of the difference to compute the location of the pointing device on a surface near the set of receivers. One version uses a separate receiver from which to determine the estimated interference signal, while another version uses the received signal at a time when there is expected to be no locating signal present in order to determine the estimated interference signal. An adaptive filter computes the estimated interference signal.

38 Claims, 18 Drawing Sheets

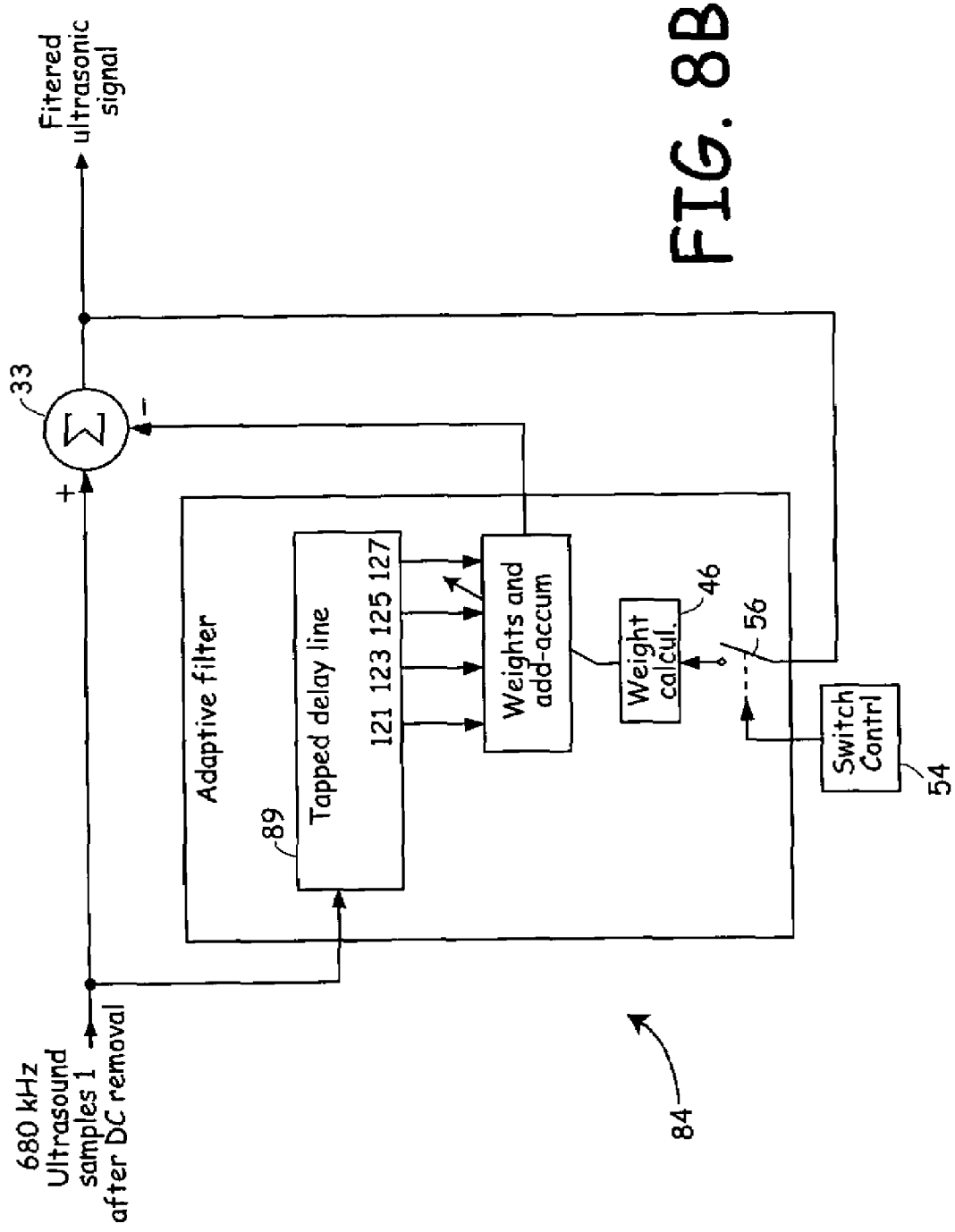

INTERFERENCE REMOVAL IN POINTING DEVICE LOCATING SYSTEMS

RELATED APPLICATION

The present invention claims priority of U.S. Provisional Patent Application No. 60/564,909, filed Apr. 23, 2004 to inventors Weaver et al., titled "INTERFERENCE REMOVAL IN POINTING DEVICE LOCATING SYSTEMS," and hereby incorporated herein by reference.

FIELD OF THE INVENTION

The present invention relates to pointing device locating systems that use signal transmitters and receivers, and in particular—to such systems operating in the presence of interfering signals such as noise.

BACKGROUND

There are known systems for determining the position or motion of a movable device, such as a stylus, a pen, a whiteboard marker, or other pointing device over a plane, which use signals transmitted through a medium, such as air, between one or more transmitters and one or more receivers, wherein the position is determined by proper processing of received signals; such systems are sometimes also referred to as active tracking systems or as location transcription systems and will collectively be referred to herein as locating systems. In one version of a locating system, depicted schematically in FIG. 1A, a transmitter 1 that is attached to a pointing device 2 emits a signal of repeated ultrasonic pulses and this signal is received by two or more receivers at known locations, e.g., attached to a stationary frame near an active substantially planar area. FIG. 1A shows two ultrasonic receivers 3 attached to a frame 5. The pointing device 2 also emits infrared pulses that are received by an infrared detector 4 on the frame 5. The relative times of arrival of the signals at each receiver are detected and from these values the distances from the transmitter 1 to the receivers 3 and 4 are determined and hence, by triangulation, also the position of the pointing device 2 with respect to the stationary frame. Thus, an active area 8 is defined wherein the location system can determine the location of the pointing device 2. A transmitter 9 transmits the so-determined positions, e.g., to a matching receiver 10 on a computer such as a laptop computer 11. Transcriptions of a set of locations, e.g., a line 12, is sent and may be stored in the computer 11.

FIG. 1B shows an example of the pointing device 2, that may include a tip 15 that may be a marking element. The pointing device includes a body 13 and a pressure sensitive switch 14 that starts transmission of the signals from the transmitters when the tip is pressed against the planar surface. One or more buttons 16 may be included in the pointing device to provide indications to the receiver array containing receivers 3 and 4.

U.S. Pat. No. 6,335,723 to Wood, et al., entitled "TRANSMITTER PEN LOCATION SYSTEM," assigned to the assignee of the present invention and incorporated herein by reference, discloses one such system for locating the position of a pen. It is noted that, in addition to a relatively slow-propagation signal, typically an ultrasonic signal, Wood, et al. also describes a version that includes on the pointing device a transmitter such that there also is transmitted and received a fast-propagation signal, typically an infrared signal, which serves to provide the ultrasonic receivers with a time base for calculating the respective propagation times of the slow signal. Both transmitted signals are structured as a mutually synchronized train of pulses. It is further noted that in an alternative embodiment, any of the signals may also serve to carry supplementary information, such as pen color, and/or other pen parameters.

U.S. Pat. No. 6,414,673 to Wood, et al., entitled "TRANSMITTER PEN LOCATION SYSTEM," assigned to the assignee of the present invention and incorporated herein by reference, discloses another such system. Here, basically, the directions rather than the times of arrival of the transmitted signal at each receiver are detected and hence the location of the pen is calculated. In one embodiment, the time of arrival at a receiver is also detected. U.S. Pat. No. 6,184,873 to Ward, et al., entitled "PEN POSITIONING SYSTEM," assigned to the assignee of the present invention and incorporated herein by reference, discloses a variation of the aforementioned systems, wherein there are two output elements attached to the pen, at given different distances from its tip, each transmitting at a unique ultrasonic frequency. The two frequencies are processed separately at the receivers, to determine the respective positions of the output elements; from these, the position of the tip of the pen is calculated.

Further variations of the aforementioned systems are possible. For example, there may be a single receiver, to determine a position along a single axis, or the number of receivers may be greater than two—to increase the accuracy of triangulation, to determine the position along three dimensions, or to increase the active area. As another example, one or more receivers may be attached to the movable device while transmitters are attached to the stationary frame. As yet another example, the medium, which in the aforementioned systems is air, may be a vacuum or may consist of any other substance, whether gaseous, liquid or solid; concomitantly, the signaling modality, besides being acoustic or electromagnetic, as in the aforementioned systems, may be any other type, such as surface acoustic waves. The pointing device itself may be of any shape and may serve any purpose in addition to just being locatable and its motion may be effected by a human operator or by a machine. The pointing device typically is movable.

FIG. 1C shows a typical functional block diagram of the sensor array that includes sensors 3 and 4 and that includes processing of the signals received by the sensors. A signal conditioner (17A, 17B, 17C) includes filtering of signals that are out of the expected frequency range, and includes anti-alias filtering. The pen 2 simultaneously transmits an ultrasound pulse and an infrared (IR) pulse. The IR pulse is assumed to travel much faster than the ultrasound pulse, and hence is received first at the IR receiver 4. An analog-to-digital converter (ADC) (18A, 18B) initially converts the infrared pulses and these digitized infrared signals are input serially to a processor, in one embodiment, a DSP device 19. In particular, the data is input to the memory of the DSP device 19. To reduce costs of additional ADCs, a switch then switches the input of the ADC to receive signals from one of the ultrasound receivers. Another ADC also receives signals from the second ultrasound receiver. Thus, after the IR pulse is received, digitized ultrasound signals are received, digitized, and input to the memory of the DSP device 19 for further processing.

In one embodiment, the program for such processing is kept in a flash memory coupled to the bus of the DSP device. The processing determines the time of arrival of the ultrasonic pulses received at the two receivers relative to that of the infrared signal. From these times of arrival and the known positions of the ultrasound receivers, the DSP device calculates the location of the transmitter at the time the ultrasound pulses were transmitted.

In one embodiment, the location information is transmitted, e.g., via Bluetooth technology or a USB cable, to another device such as a computer 11.

Common to all such systems, which the present invention addresses, is the presence of at least one transmitter and at least one receiver, at least one of which is attached to a movable device; any transmitter transmits through the medium at least one useful signal, which is received by at least one receiver and subsequently processed; the processing of one or more of the received signals leads to a determination of the current position or velocity of the movable device along at least one dimension. The useful signal may be either in a slow propagating mode, such as acoustic (usually ultrasonic) waves, serving to manifest propagation time that is proportional to, and thus indicative of, the distance traveled in the medium, or it may be in a fast propagating mode, such as electromagnetic waves (usually in the IR range), serving, for example, to provide time reference; in either role it will also be referred to herein as a locating signal, though it may optionally have other information encoded thereto. A locating signal is generally characterized by a given carrier frequency, as is known in signaling practice.

It is often the case that there is an interfering signal present in the medium or transmitted therethrough, such a signal emanating, e.g., from a source other than any of the system's transmitters, and such a signal received by any of the receivers in addition to the useful signal. The interfering signal may, for example, be electromagnetic induction from power lines and devices, light from high-frequency lighting devices or an ultrasonic signal from another source, such as a motion detector. Such interfering signals may degrade the results of the corresponding processing, possibly causing an error in the determined position or velocity or even making such determination altogether impracticable. Generally, locating and tracking systems require a relatively high degree of accuracy and resolution—typically 1:1000 or better—and therefore even relatively low levels of interfering signals may be deleterious. Interfering signals may be regarded as noise. In this description, noise, interference, interfering noise, and so forth are all used to mean the signal or signals interfering with the locating signals.

Now, if the interfering signal is clearly distinguishable from the useful signal—for example, by having all frequencies substantially different from the useful signal's carrier frequency or by occurring within time periods distinct from those in which the useful signal occurs—then the component of the received signal due to the interfering signal may be removed or sufficiently reduced, using filtering techniques known in the art. If, however, the interfering signal has frequency components close, or identical, to the useful signal's frequency and if it occurs substantially during time periods at which the useful signal occurs, no such filtering is effective for such components. It thus is desirable and would be useful to have a method and apparatus to reduce interfering components in the received signal in a locating system especially in such cases as last discussed.

The inventors have found, for example, that for infrared detectors, fluorescent lights often emit interference in the same frequency range as the infrared location signals used in location determining systems. Furthermore, ultrasound motion detectors often produce ultrasound signals that are in the same frequency range as the ultrasound location signals used in location determining systems, and that are so strong as to reduce the accuracy of such systems, possibly even rendering the location determining system unusable in the presence of the interference.

Thus there is a need in the art for a method for reducing the amount of interfering noise in locating signals used in location determining systems.

SUMMARY

One aspect of the present invention is a method to reduce a noise component, relative to the useful component, in a signal received by a receiver from the transmission medium in a locating system, even in the case that the noise and the useful component occur during common time periods and have a component in the same frequency range. Basically, the method calls for producing, from a received signal, an estimated interference signal that is indicative of the noise component and then subtracting the estimated interference signal from the signal received from the medium. The result of the subtraction is subsequently processed, as in the corresponding conventional system, to serve the intended purpose of the useful signal.

In one group of embodiments of the invention, particularly applicable to cases in which the locating signal is intermittent, e.g., formed as a train of pulses, the estimated interference signal is produced from the signal received by the same receiver that receives the locator signal, but a certain time interval earlier. In one embodiment, the signal received earlier is delayed by the certain time interval and filtered by an adaptive filter, to produce the estimated interference signal. In another embodiment, suitable in the case that an interfering signal has a substantial amount of its energy in a single frequency, the signal received earlier is analyzed as to its frequency, phase and amplitude and an estimated interference signal is generated accordingly.

Disclosed herein is a method for determining the location of a pointing device in the vicinity of a set of receivers able to receive one or more locating signals transmitted through a medium. The method includes receiving at a receiver a signal, which includes a locating signal and an interfering signal, determining an estimated interference signal indicative of the interfering signal included in the received signal, determining a signal indicative of the difference between the received signal and the determined estimated interference signal, and using the determined signal indicative of the difference to compute the location of the pointing device on a surface near the set of receivers.

Other aspects and features are described below and in the claims attached hereto.

BRIEF DESCRIPTION OF THE DRAWINGS

The invention will now be described with the help of the following drawings.

FIG. 8B shows one embodiment of an adaptive interference reduction unit for an ultrasonic signal using an adaptive filter that includes a tapped delay line that provides a delay of 121 units.

DETAILED DESCRIPTION

Location Determining Systems

Figure 1A:
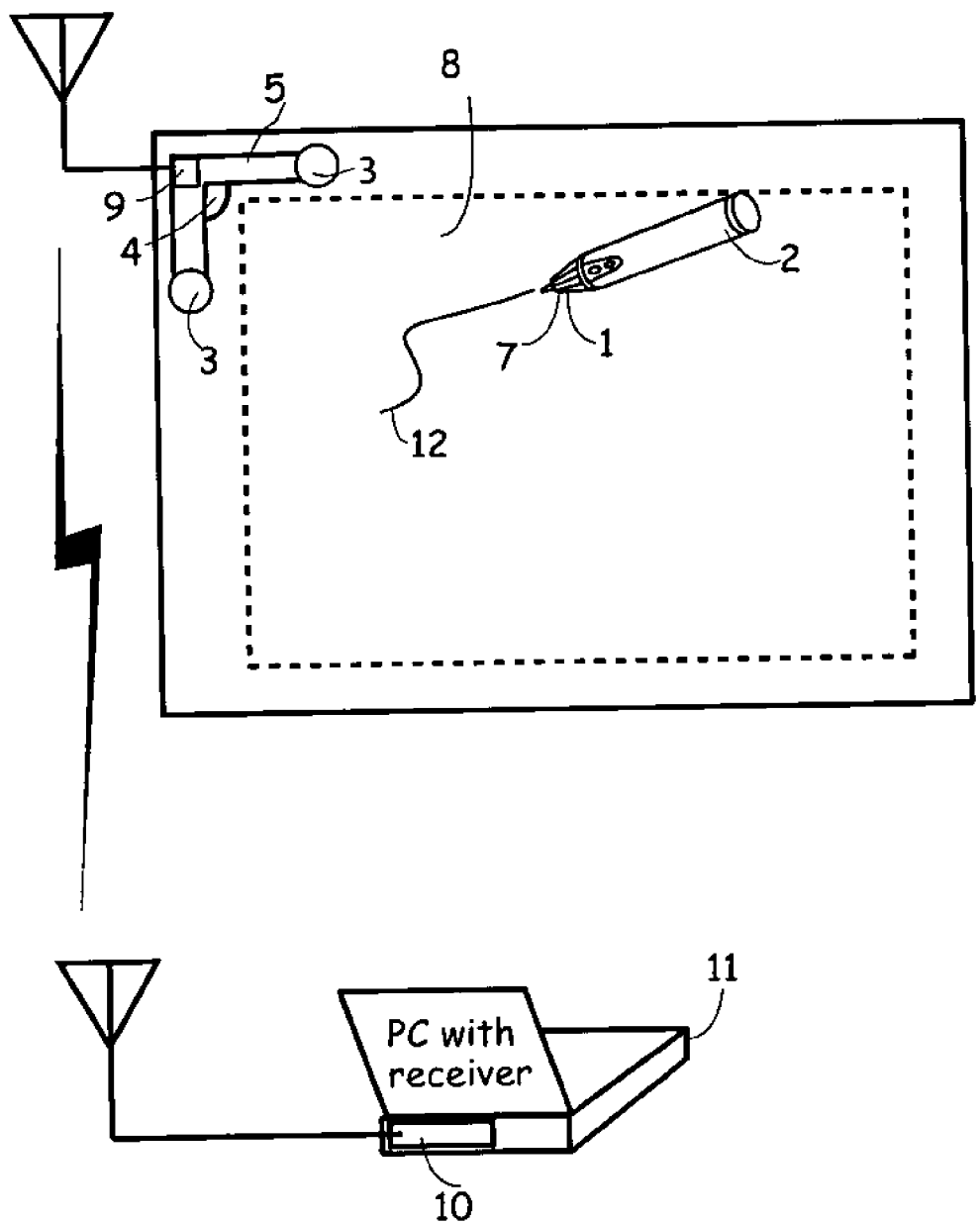
FIG. 1A is a diagram of a typical locating system. It is marked "Prior Art," but is not prior art when it includes aspects of the present invention.
Figure 1B:
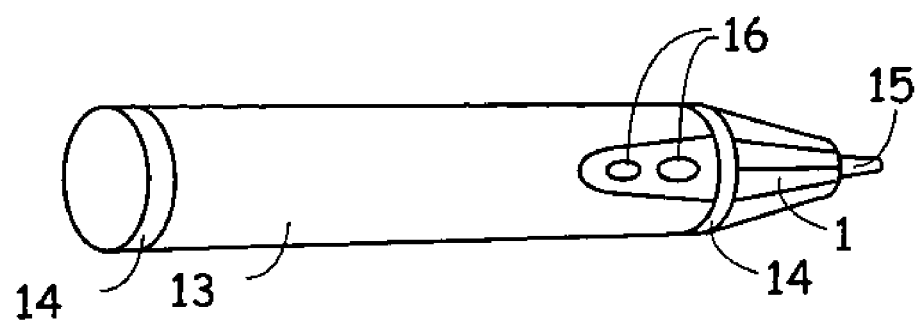
FIG. 1B is a diagram of a typical pointing device of the locating system shown in FIG. 1A. Such a pen may be prior art.
Figure 1C:
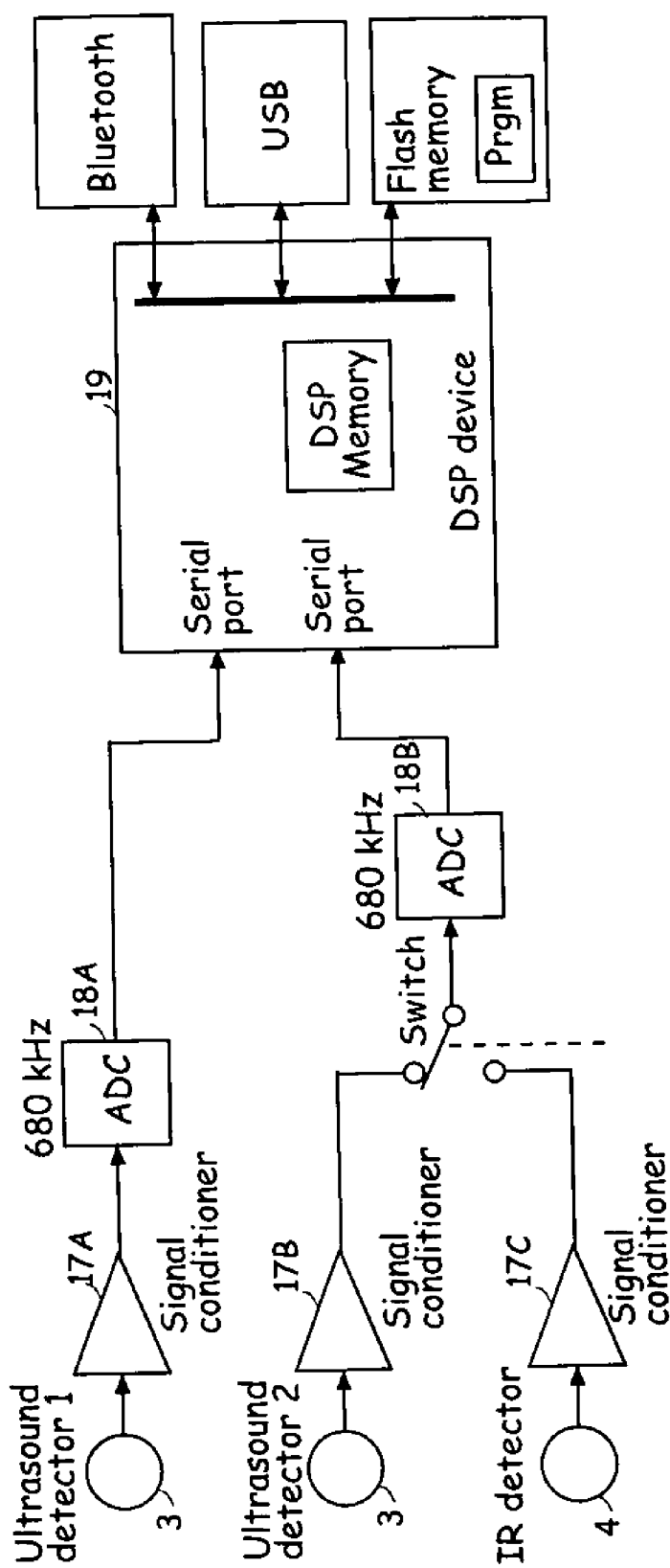
FIG. 1C is a functional block diagram of the receiving part of the locating system shown in FIG. 1A. It is marked "Prior Art," but is not prior art when it includes aspects of the present invention.
Figure 2A:
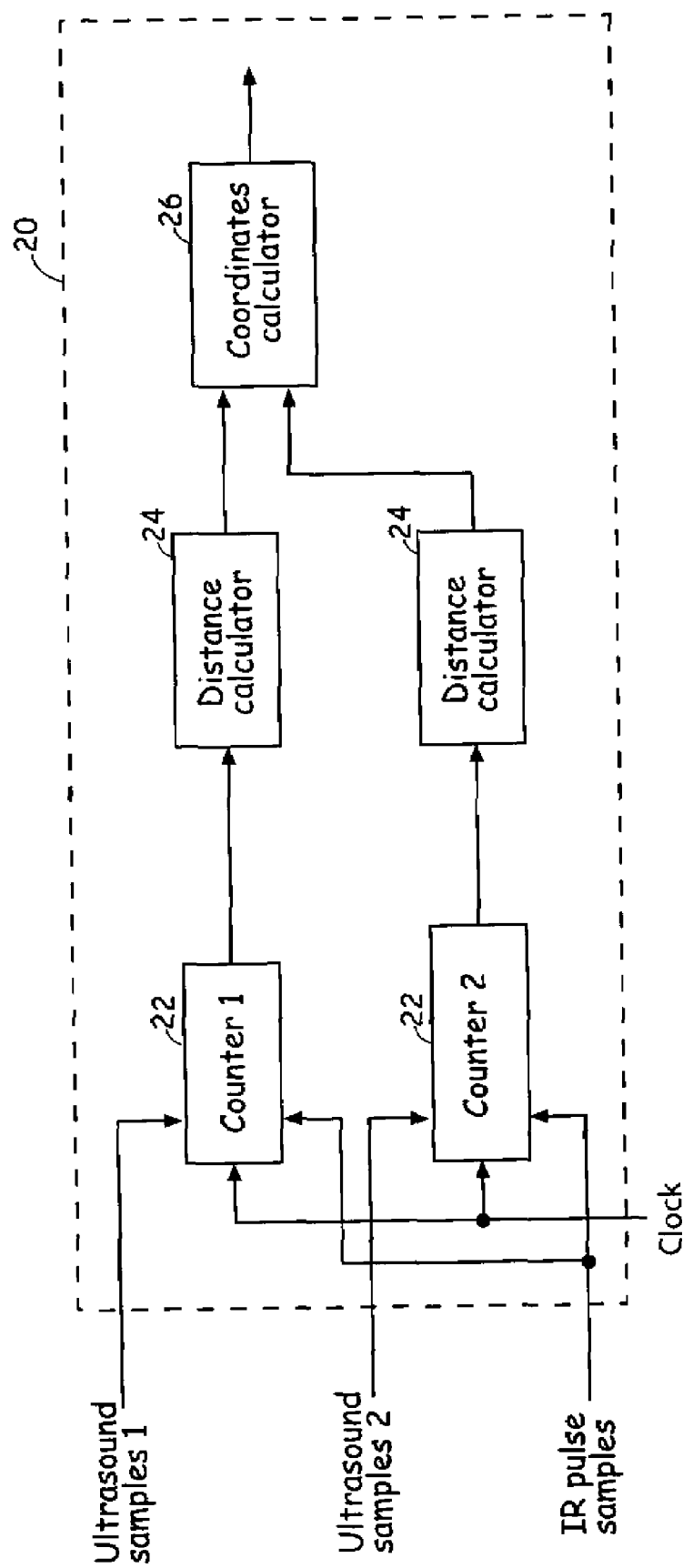
FIG. 2A shows the basic digital processing logic in an exemplary prior art locating system that uses three receivers, the first two of which receive ultrasound locating signals and the third of which receives an infrared timing signal.

One version of the basic digital processing logic in an exemplary locating system of prior art, such as that depicted in FIGS. 1A and 1C, is presented schematically by the block diagram of FIG. 2A. In this case there are three receivers (not shown), the first two of which receive ultrasound locating signals and the third of which receives an infrared timing signal. For purposes of explaining the invention, the switch and the ADCs of FIG. 1C are not shown, and it is therefore assumed that the system operates as if three signals are separately input. The two received ultrasound signals after digitization and the infrared signal after digitization are input to the digital processor as signals US1, US2, and IR, respectively. The locator processor 20 shown within the broken line box includes two counters 22, one for each of the two input locating signals. Each counter counts supplied clock pulses, then is reset to zero by each detected pulse in the timing signal (IR) input and stops counting upon the detection of a pulse in the corresponding locating signal input. The value from each counter is fed to a corresponding distance calculator 24. The outputs from the two distance calculators are fed to a coordinates calculator 26, whose output forms the output of the system.

Note that FIG. 2A is a simplified description, and does not, for example, describe the mechanism used for actually determining the times of arrival of the ultrasound signals from their digitized form. However, such a description is sufficient for the purpose of describing aspects of the present invention.

Figure 2B:
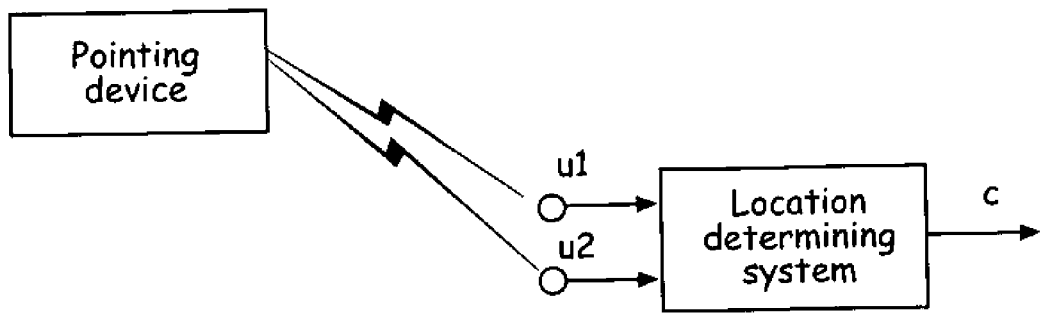
FIG. 2B is a simplified block diagram of a generic position determining system.
Figure 2C:
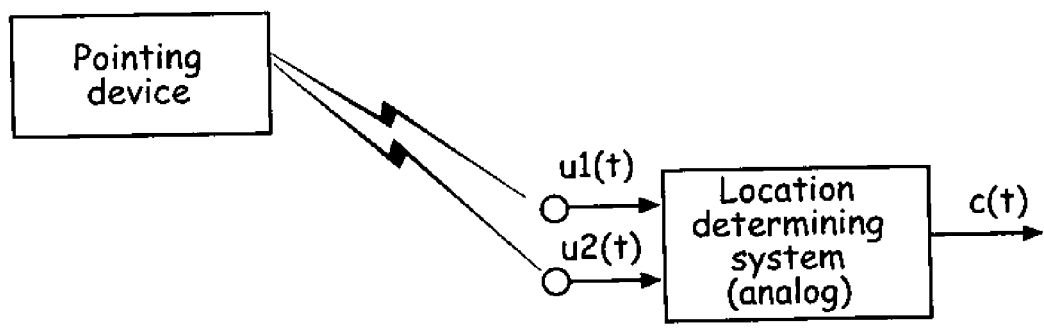
FIG. 2C is a simplified block diagram of an analog position determining system.
Figure 2D:
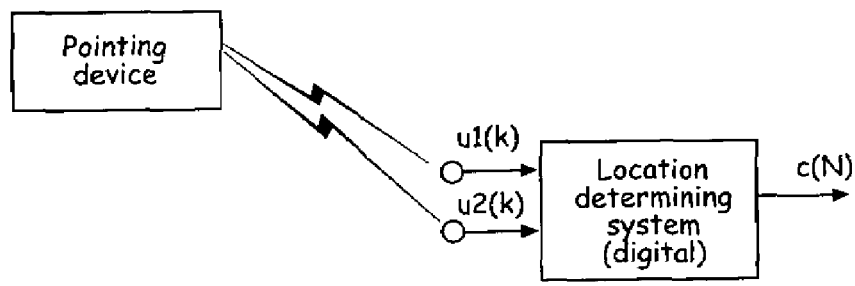
FIG. 2D is a simplified block diagram of a digital position determining system.
Figure 2E:
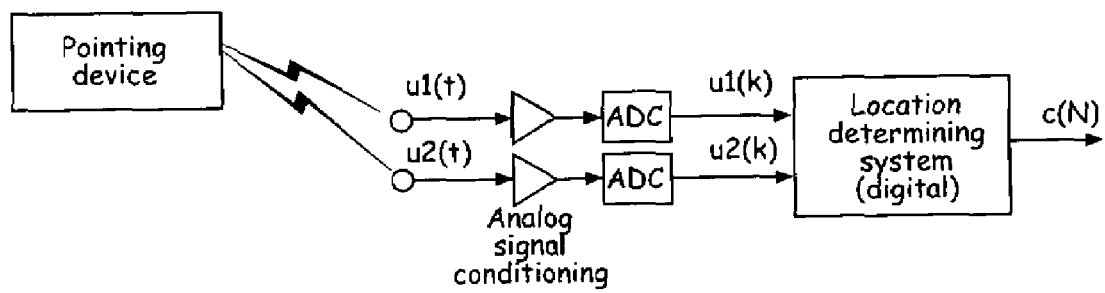
FIG. 2E is a simplified block diagram of a hybrid analog and digital position determining system.

Note also that FIG. 2A only deals with the aspects of determining the location. The location determining system may be analog, digital, or a combination of analog and digital. FIG. 2B, for example, shows a simple generic location determining system that accepts two signals denoted u1 and u2 and produces a set of coordinates denoted c that represent the measured position of the pointing device. FIG. 2C shows in simplified form a design where such a location determining system is to receive analog signals denoted $u1(t)$ and $u2(t)$, perform processing on $u1(t)$ and $u2(t)$, where t denotes time, and periodically update a position denoted c(t), which is produced by the location determining system as one or more analog signals. FIG. 2D shows in simplified form a design wherein such a location determining system receives digital signals denoted $u1(k)$ and $u2(k)$ at times denoted t(kT), where k is an integer index, and T is a time period, and determines coordinate information c(N) at times t(NT'), where again N is an index and T' is a time period. Usually the period T' of the times t(NT') is such that the times are spaced further apart in time than times t(kT). Thus, the location determining system can consider many samples of $u1(k)$ and $u2(k)$ before updating the measured position c(N). FIG. 2E shows the preferred method of location determining, which is a hybrid of analog and digital processing. Signals $u1(t)$ and $u2(t)$ are conditioned using analog circuits. The signals are then periodically sampled by analog to digital converters (ADCs) and thus converted into digital signals $u1(k)$ and $u2(k)$ before being input to the location determining system. The present invention can be applied to any of these different embodiments of location measurement systems as well as to other hybrids of digital and analog processing systems.

Figure 7:
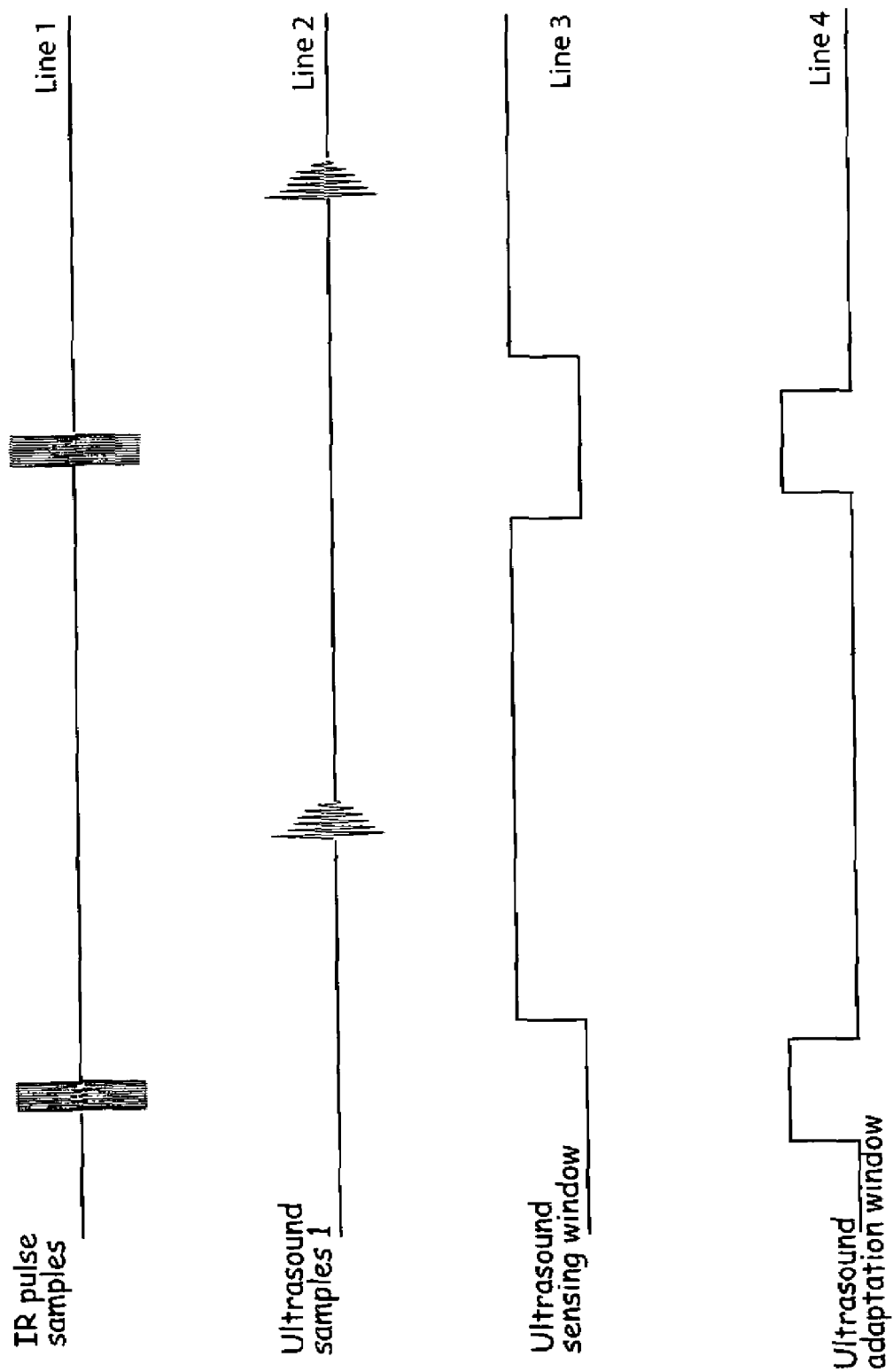
FIG. 7 is a timing diagram, illustrating typical signals that occur in one or more embodiments.

FIG. 7 shows a set of signals pertaining to any one of the counters and corresponding received ultrasound signals. The timing signal (Line 1 denoted IR) includes a train of regularly spaced pulses, wherein the period of such pulses forms a measuring cycle. The length of the measuring cycle is chosen to exceed the longest possible propagation time through the medium of the locating signal over the active area, i.e., the area in which location of a movable device is to be determined. Each ultrasonic locating signal includes a train of pulses, in one embodiment spaced identically in time to the timing signal pulses. Thus, when a corresponding ultrasound transmitter and infrared transmitter transmit, the locating signal pulses are essentially synchronous with the infrared timing signal pulses. Upon reception, however, the locating signal pulses lag the IR by a certain amount of time, as seen in Line 2—denoted US—in FIG. 7. Assuming infrared travels essentially instantaneously, this time is the propagation time of the ultrasound signal through the medium, and thus is proportional to the distance from the transmitter to the corresponding receiver assuming a constant propagation velocity in the medium, and line-of-sight propagation. It is a measure of this propagation time that the counter 22 counts. Depending on the actual present distance between the transmitter and the receiver, the value of the propagation time may vary over a given range, depicted in Line 3 of FIG. 7 as the "US sensing window". At the end of the sensing window, the value of the count is fed to the corresponding distance calculator 24, which multiplies it by a factor proportional to the signal propagation speed, to arrive at a distance value. The distance values from the two distance calculators 24 are fed to the coordinates calculator 26. In one embodiment, the coordinates calculator 26 is calibrated using knowledge of the position coordinates of the receivers. Using the outputs of the two distance calculators 24, the coordinates calculator 26 proceeds to calculate, by triangulation, the coordinates of the transmitter indicative of the position of a reference point on the movable device.

The entire processing logic, as described, for example, above and shown as 20 in FIG. 2, is prior art and will be referred to as the locator. It is typically carried out by a digital signal processor (DSP) device, as depicted in FIG. 1C, but may also be embodied in other ways. It will, furthermore, be appreciated that the locator may also incorporate other forms of logic and that the sole purpose of describing it here is to serve as an exemplary context within which to explain the present invention.

Noise Reduction

As mentioned in the Background section, there are situations in which any of the signals entering the locator 20 may also contain a noise component. For example, motion detectors may interfere with the ultrasound signals. As another example, fluorescent lights may interfere with the infrared signals. One aspect of the invention is to reduce or remove the noise component from the signal, e.g., prior to calculations being performed thereon for the purpose of determining location. Without loss of generality, it may be assumed that such interfering noise is continuous and is present also during the expected occurrence time of the respective signal pulses. It further may be assumed that the interfering noise includes frequencies very near or at those of the corresponding carrier (IR or ultrasound). Any noise of components outside this frequency range may be appropriately reduced or removed by conventional filtering, as known in the art.

Figure 3:
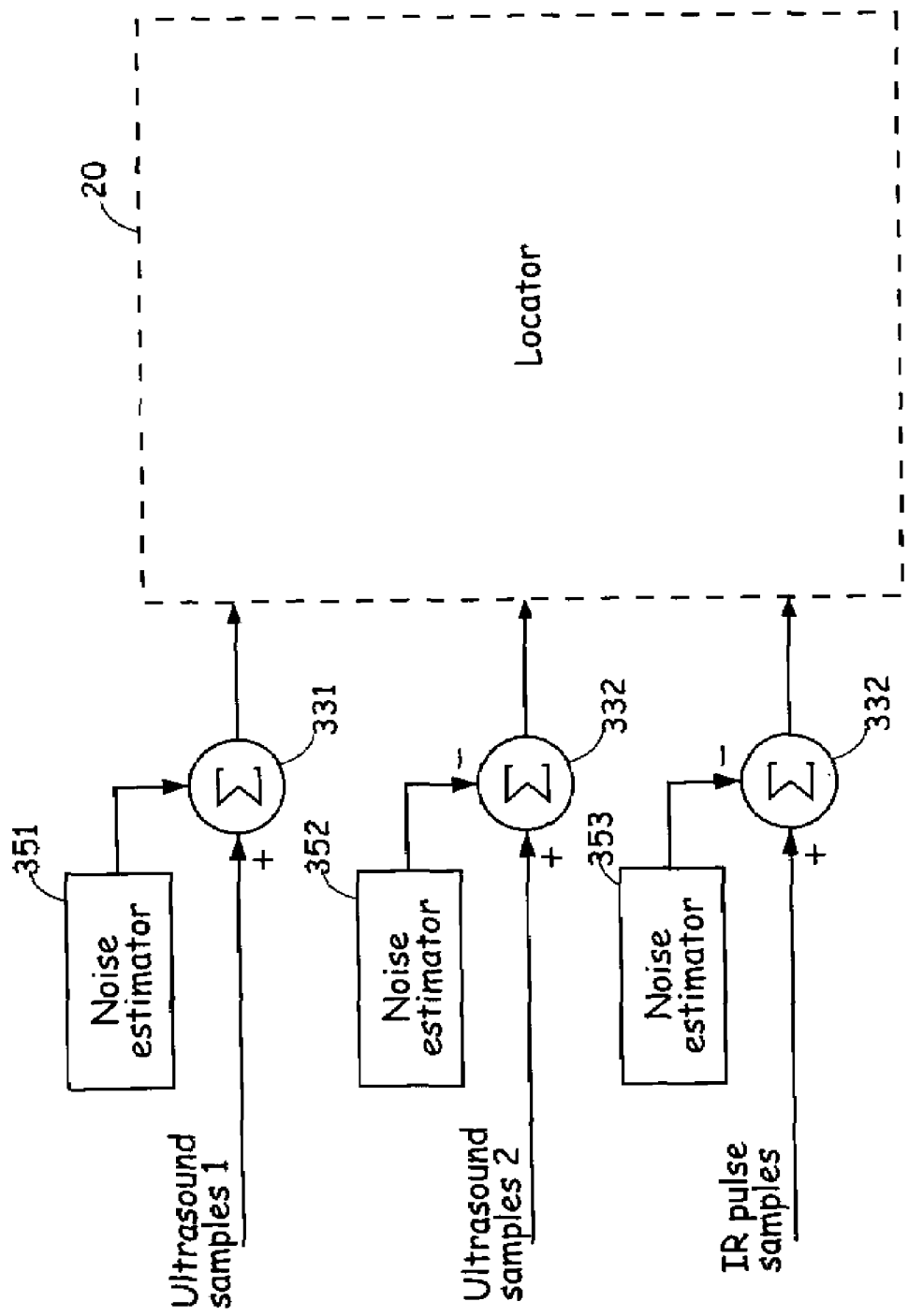
FIG. 3 is a block diagram of modified digital processing of received signals in the system of FIG. 1, illustrating principles of the invention.

The basic principles of the invention are illustrated by the simplified block-diagram of FIG. 3, which depicts additional blocks in each of the inputs to the locator 20, which may be identical to the locator of FIG. 2A or any other one of prior art. In each input line there is seen a summing device (an adder), shown respectively as 331, 332, and 333 for each of the respective signal paths, with a positive input and a negative input, thus functioning effectively as a subtractor. The terms an adder having one positive and one negative input, and a subtractor are used synonymously herein. One input, here the positive input, receives the corresponding signal from the receiver and the other input, here the negative input, receives what is called herein an "estimated interference signal" from a corresponding interfering noise estimator, shown as 351, 352, and 353 for each of the signal paths. One aspect of the invention is that the estimated interference signal is a close approximation of the noise component expected in the received signal and thus the subtraction action effectively reduces or eliminates the noise component, leaving only the signal used for the locator system. The quality of the estimated interference signal determines how effectively the noise component is cancelled in the output from summing device 331, 332, or 333.

Disclosed herein are several embodiments of the noise estimator 351, 352, and 353. In general, if such noise estimators are included for all signals, e.g., for the two ultrasound signals and the infrared signal, the ones 351 and 352 for the ultrasound signals, may be different than that, 353, for the infrared signal.

In general, the noise estimator and the summing device may be embodied as analog circuitry, in which case they would be positioned prior to the corresponding ADC (FIG. 1C), or as digital processing modules, including code blocks in a programmable processor. In one embodiment, a noise estimator 353 for the infrared signal, is included and implemented as an analog circuit, while those 351 and 352 for the ultrasound signal in digital processing modules. In another embodiment, all estimators 351, 352, and 353 are implemented in digital form. The latter embodiment is preferred because it allows incorporating all modules in the same digital processor that serves for the locator 20.

Various embodiments of the invention will now be described in greater detail, in terms of any one of the signals input to the locator. It will be appreciated that the invention is thus applicable to any of the signals, as well as to any other similar signal.

Use of Separate Reference Signal Receiver(s)

Figure 4A:
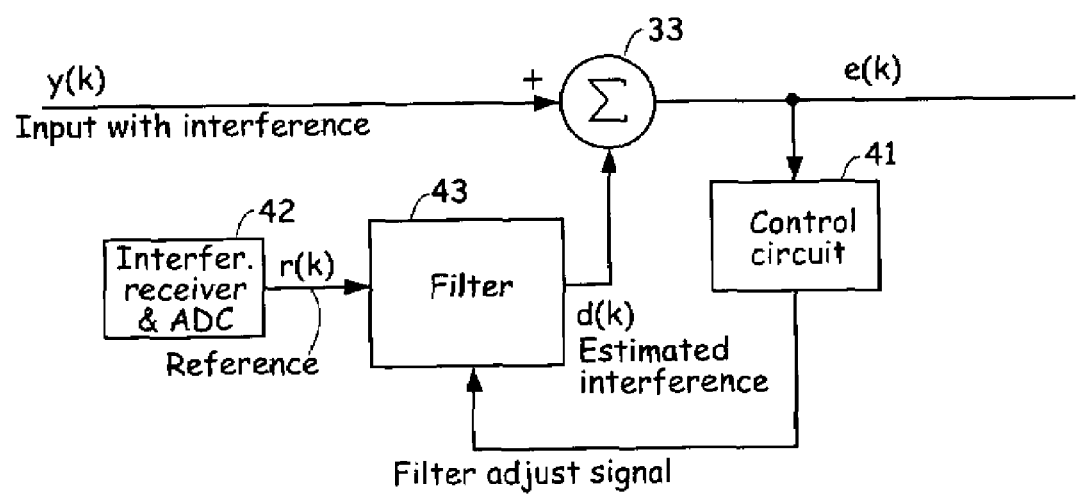
FIG. 4A is a block diagram of additional digital processing of a received signal according to a first embodiment of the invention

Reference is now made to FIG. 4A, which depicts schematically a first embodiment of the invention. In this embodiment, an additional receiver 42 is provided, to be termed an "interference receiver" or a "reference signal receiver," which is placed so as to receive a signal (a reference signal) that in this version is separate from those signals used for the locator signal. The interference receiver is instead configured to measure a signal from which the interfering signal or an estimate thereof can be determined. The interference receiver may measure the interference directly or may measure a quantity that is correlated to the noise component to be removed, for example a lower amplitude version, and/or time-shifted version of the actual noise component present in the signal received for location determining. All such versions of the reference signal have in common that each is correlated to the interfering signal that appears with the location signal.

In the digital embodiment, the receiver 42 is assumed to include any appropriate analog signal conditioning and appropriate conversion to a digital version, similar to those of the other receivers (e.g., as depicted in FIG. 1C).

The received interference signal (the reference signal) is applied to a filter 43. In one embodiment, the filter 43 is pre-set, e.g., chosen at the factory to appropriately filter the received interference signal, also called the received reference signal, to produce an estimated interference signal. In another embodiment, the filter can be settable. In one embodiment, the filter can be a simple amplitude adjuster to adjust for gain differences between the gain the interference component in the locator signal experiences, and the gain the reference signal experiences. In another embodiment, one or more delay elements may be included. In general, the filter is defined by a set of one or more filter parameters.

In one version, several sets of filter parameters are provided. The set to use for the filter is according to a selection criterion.

One such selection criterion is now discussed.

Denote by y(k) the values of the received signal, s(k) the desired signal, and n(k) the interfering noise. Then assume the noise is additive, i.e., $$y(k)=s(k)+n(k).$$

Denote the estimated interference signal as d(k), and the error as e(k). Then $$e(k)=y(k)-d(k)=s(k)+n(k)-d(k).$$

Denote expected value, i.e., the mean value, by $E\{.\}$. The mean of the squared error, assuming that the desired signal s(k) is uncorrelated both to n(k) and to d(k) is approximately $$E\{e^2(k)\} \approx E\{s^2(k)\}+E\{[n(k)-d(k)]^2\}.$$

Thus, by minimizing $E\{e^2(k)\}$, one obtains an output that minimizes the amount of interference. One estimate of $E\{e^2(k)\}$ is the sum of squared errors, e.g., over some number, denoted M, of samples. Thus, denoting by $\underline{e}(k)$ the vector of the M error signals, i.e., $$\underline{e}(k)=e(k), e(k-1), \ldots, e(k-M+1),$$

one criterion for selecting the set of filter parameters is to select the set that minimizes the sum of the squares of e(k)'s, being $$\Sigma_{i=0 \text{ to } M-1}[e^2(k-i)]=\underline{e}(k)\cdot\underline{e}(k), \text{ where } \cdot \text{ denoted the inner product.}$$

See below for more description of a least squares method, applied however to a different embodiment in which the reference signal is obtained from the same receiver as that receiving the location signal.

Thus, one embodiment of the invention selects the set of filter parameters that minimize the amount of interference. Other criteria are possible and other embodiments use one or another of such other criteria.

Use of an Adaptive Filter

Figure 4B:
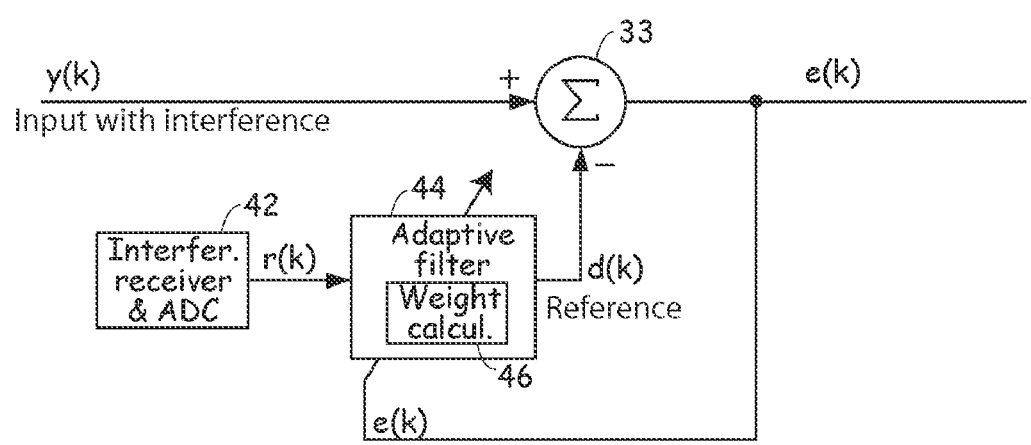
FIG. 4B is a schematic diagram of an embodiment of a FIR filter that can be used in the processing shown in FIG. 4A.

FIG. 4B shows a second embodiment, in which the filter that filters the received reference signal that provides an estimated interference signal is a digital adaptive filter 44. Digital adaptive filters are known in the art and have been extensively described in the literature. A suitable type of an adaptive filter is the Finite Impulse Response (FIR) adaptive filter with adaptively determined coefficients (weights), which is readily realizable in a DSP, as well as other digital processors and circuits. The weights of the FIR filter are determined by a weight determiner 46 according to one of several well known adaptive filter weight determining methods in order to reduce the amount of interference in the output, using as an error signal, the difference between the input signal and the estimated interference signal out of the adaptive filter. The purpose of the adaptive filter is to make the filtered version of the interference signal similar to the actual interference in the input signal.

Figure 4C:
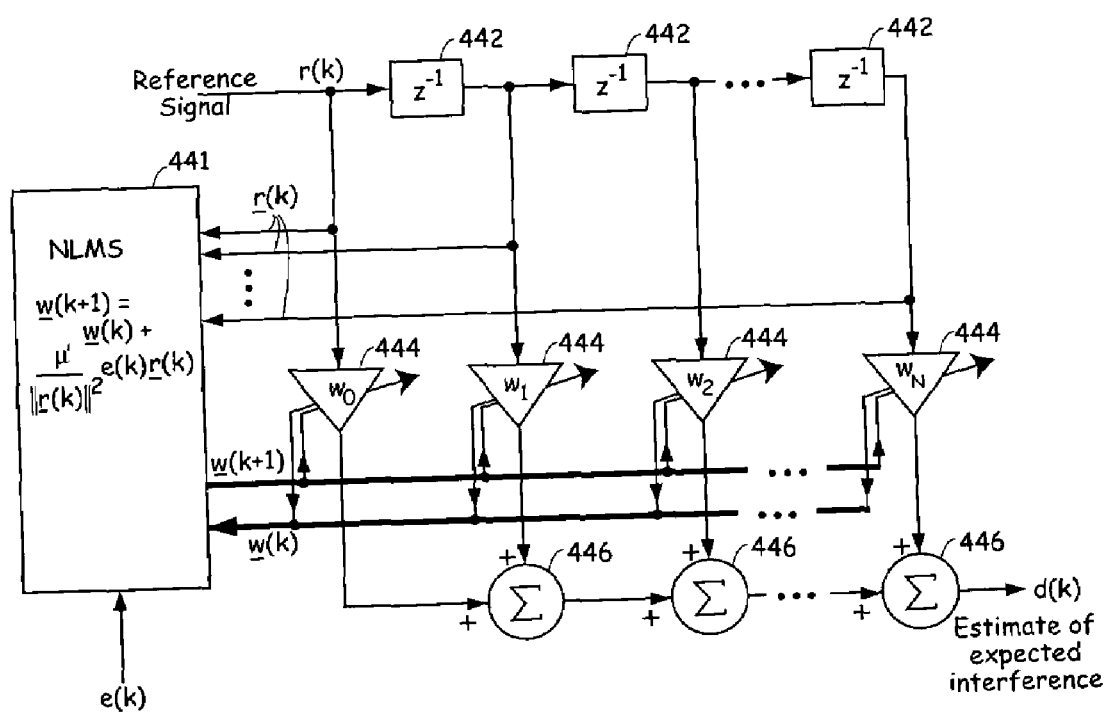
FIG. 4C shows one embodiment of an adaptive filter structure for the filter.

One adaptive filter structure for filter 44 is illustrated in FIG. 4C, and includes a series of delay sections 442, through which the signal passes, variable coefficient units 444 that provide variable gain or attenuation, and that tap the signal at corresponding delay points. These coefficient units 444 are typically implemented by multipliers, and provide to each such delayed version of the input a given relative weight. Each weighted delayed version is summed by an adder-accumulator 446, and there are a series of such adder-accumulators 446, such that the final adder accumulator provides the output as a weighted sum of delayed versions of the input signal. A DSP device typically includes sets of multipliers and add-accumulate units for carrying out such filtering operations. The output of the filter is the estimate of the interference denoted d(k) that estimates the interference in the input signal, and such estimate d(k) is applied to a corresponding input of a corresponding adder 33, the other input being the normally received signal denoted y(k), such as US1 in FIG. 4A that is assumed to include interference. The output of the adder 33, denoted e(k), varies as the difference between the normally received signal y(k) that may contain interference, and the estimated interference signal d(k) that estimates the interference, and that is obtained by adaptive filtering. Such output of adder 33 is to be input to the locator 20 (FIG. 3), and is also applied to an adaptive weight calculator 46 in the adaptive filter 44.

The adaptive weight calculator 46 monitors the difference signal shown as e(k) and accordingly calculates the adaptively determined weights, shown as weights $w_0(k)$, $w_1(k), \ldots, w_N(k)$ for N delays and expressible as an N+1 weight vector $\underline{w}(k)$ at discrete time instant denoted by index k.

Thus, the output e(k) is $$e(k)=y(k)-d(k)=\underline{w}(k)\cdot\underline{r}(k)$$

where the vector $\underline{r}(k)$=vector of r(k), r(k-1) ... r(k-N), the present value and N past values of the reference signal r(k), and · represents an inner product (a dot product). This is a vector form of expressing the convolution operation of the FIR filter.

The weight determining unit 46 adjusts the weight vector $\underline{w}(k)$ according to previous values, to the previous error value, and to previous values of the interference signal. Thus, the weights in the filter are varied, as indicated by the arrow across the filter block in FIG. 4A, thus completing an adaptive correction loop. The iterative weight calculation is preferably according to one of several variants of the Least Mean Square (LMS) algorithm, according to which the weights adapt towards the weights that minimize the mean square error between a desired signal and the output signal As above, suppose y(k)=s(k)+n(k), where n(k) is the interference in the input signal y(k) and s(k) is the desired signal, and define the error as $$e(k)=y(k)-d(k)=s(k)+n(k)-d(k).$$

As was shown above, $E\{e^2(k)\}\approx E\{s^2(k)\}+E\{[n(k)-d(k)]^2\}$. Thus, by minimizing the mean squared output of the summer, $E\{e^2(k)\}$, one obtains an output that minimizes the amount of interference.

While it is known that methods such as the steepest descent methods iterate towards achieving the minimum by moving in the direction of the vector gradient, the purpose of various weight calculation methods, e.g., the LMS method, or its normalized variant, NLMS, is to approximate the gradient by an estimate determined from the error (output of the adder) and the input interference signal.

Denote the k'th iteration of the weight vector by $\underline{w}(k)$.

In one embodiment, the next weight vector is expressed by the following formula:

$$\underline{w}(k+1)=\underline{w}(k)+\mu e(k)\underline{r}(k)$$

where $\underline{r}(k)$ is the vector of r(k), r(k-1), ..., r(k-N), the present value and N past values of the input to the adaptive filter, i.e., the reference signal obtained by the interference receiver. k is an index indicating a sample in time, $\underline{w}(k)$ is a vector indicating the set of weight values at the k'th sample time, $\mu$ is a parameter that controls the adaptation rate, also called the gain, the step size, or the forgetting factor, and e(k) is the desired output (difference) signal value at the current sample point k.

In one embodiment, the normalized variant of the LMS method—the Normalized Least Mean Squared (NLMS) method—is used. The forgetting factor $\mu$ that controls the adapting rate is scaled according to the inverse square of the signal energy. That is, for a number N of signals, is scaled according to 1/[N Input signal power]. In one embodiment, denoting $\underline{r}(k)$ as the vector of the reference input to the adaptive filter, the adaptation is according to:

$$\underline{w}(k+1)=\underline{w}(k)+\mu e(k)\underline{r}(k),$$

where $$\mu=\mu'/\{\lambda\|\underline{r}(k)\|^2\}=\mu'/[\underline{r}(k)\cdot\underline{r}(k)].$$

The parameter $\mu'$ is selected to be between 0 and 2, usually less than 1.

In yet another version of the NLMS method, $$\mu=\mu'/[a+\underline{r}(k)\cdot\underline{r}(k)],$$

where a is a positive constant.

Other alternate versions of the LMS method also are known, such as the sign LMS, in which the adaptation is:

$$\underline{w}(k+1)=\underline{w}(k)+\mu e(k)\text{sgn}\{\underline{r}(k)\},$$

where sgn{ } is +1 or −1 according to whether $\underline{r}(k)$ is positive or negative.

Other adaptive filters also are known and may be used.

Note that a single reference receiver may be used for correcting the signals of all the normal receivers of the same modality—e.g., the two ultrasonic receivers. It is also noted that the blocks "Interference receiver" 42, "Adaptive filter" 44 and "adaptive weight calculator" 46 in FIG. 4A collectively constitute, in effect, any one of the blocks generically named "Noise estimator" 351, 352, or 353 in FIG. 3.

Differential Detectors

One version of the embodiment described above is used for reducing noise in the infrared channel.

Figure 1D:
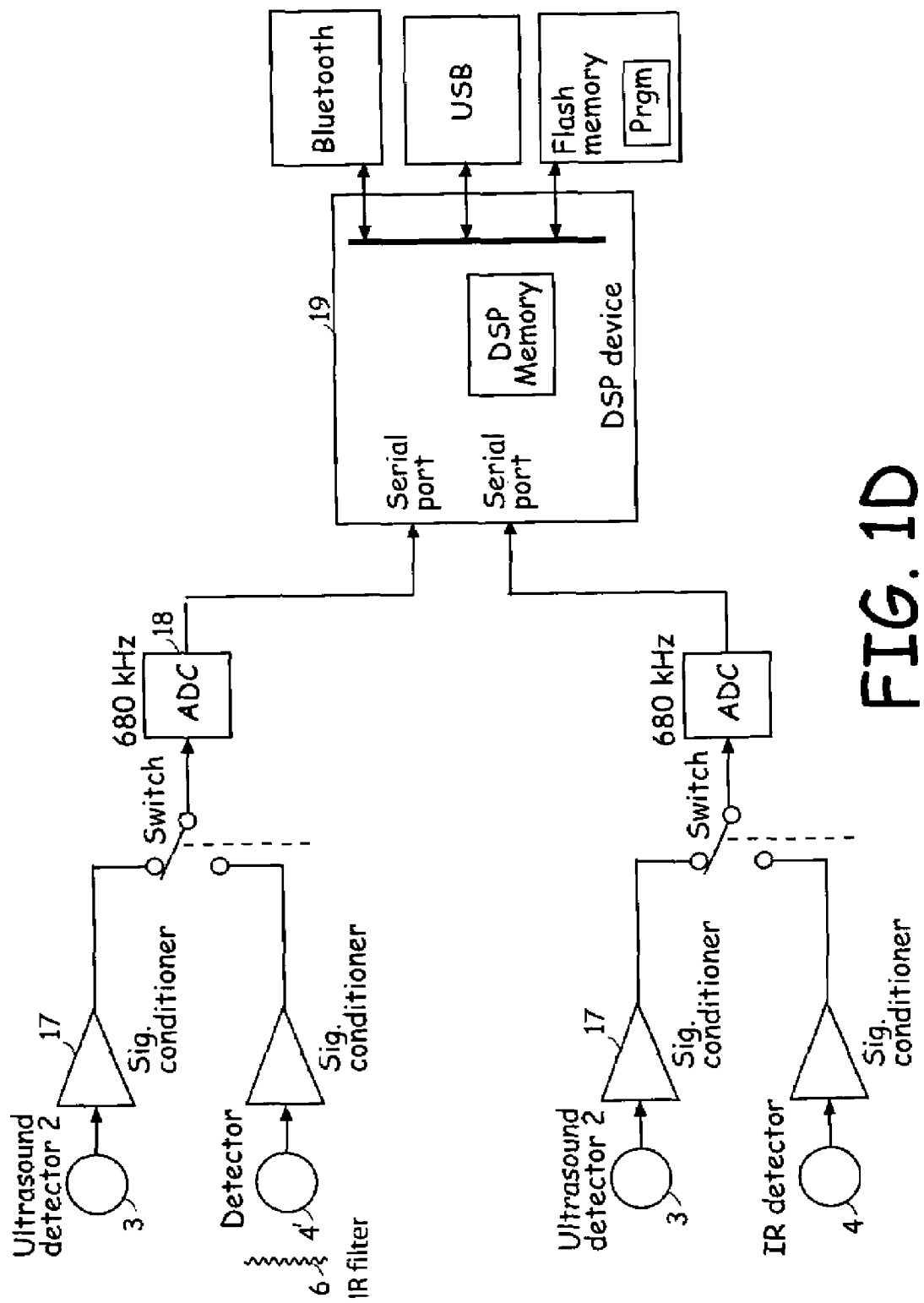
FIG. 1D shows a simplified block diagram of one embodiment of the invention that performs interference reduction using adaptive filers on the ultrasonic received signals using the ultrasonic receivers, and a filter and infrared receiver to carry out interference reduction on the infrared signal.

The inventors discovered that fluorescent lights, or components used to produce the electric signals for fluorescent lights, often produce interference to the infrared signal. However, the inventors also discovered that the visible light component from such fluorescent light is correlated to the infrared component. Thus, in one embodiment, a separate receiver is used to measure a reference signal to determine the interference estimate for the infrared signal. In one embodiment, such a reference signal is produced by physically placing a physical IR filter around a receiver to filter out the IR component to produce a reference signal that is relatively free of the useful IR signal. FIG. 1D shows one arrangement for so detecting and storing digital samples denoted r(k) of such a reference signal. The two sensors 3 are each for ultrasound. The signals 4 and 4' are for electromagnetic radiation. Sensor 4 is for IR radiation as in FIG. 1C. Sensor 4' includes a filter 6 that reduces radiation in the IR range. In one embodiment, a thin-film infrared filter, made by UNAXIS OPTICS of Golden Colorado is used around the sensor to significantly reduce the near-infrared that includes processing of the signals received by the sensors.

As in FIG. 1C, a signal conditioner includes the filtering of signals that are out of the expected frequency range, and includes anti-alias filtering. The two analog-to-digital converters (ADC) initially convert the electromagnetic radiation pulses and these digitized electromagnetic radiation signals are input serially to a processor, in one embodiment, a DSP device 19. In particular, the data is input to the memory of the DSP device 19.

While in one embodiment, separate ADCs may be used for each of the electromagnetic energy signals, in the embodiment shown in FIG. 1D, two switches then switch the inputs of each of the ADCs to receive signals from a respective one of the ultrasound receivers. Thus, initially, one channel stores samples of the IR signal, while another stores samples of the reference signal to use for reducing the interference in the IR channel. Then, after the IR pulse and the electromagnetic reference signal are received, digitized ultrasound signals are received, digitized, and input to the memory of the DSP device 19 for further processing.

Figure 4D:
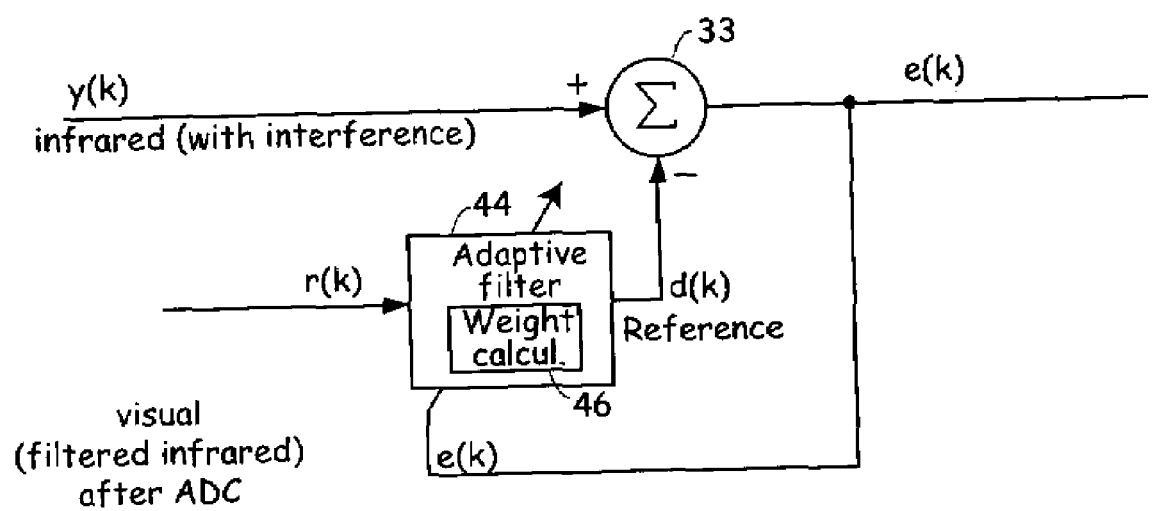
FIG. 4D shows the processing used in one embodiment to reduce the interference in the infrared channel.

FIG. 4D shows the processing used in one embodiment to reduce the interference in the infrared channel. The stored reference signal is in this case the digitized signal of the sensor that received the filtered radiation, i.e., with very little IR, while the other channel includes the IR pulses emitted by the pointing device, and also any interfering noise. The adaptive filter adapts using the reference signal to produce a relatively interference-free signal to use for the infrared channel of the pointing device.

Using the Same Receiver for Interference and for Location Signals

A different additional set of embodiments is now described. Common to the following additional embodiments is that the received interference signal (also called reference signal) r(k) from which is obtained the estimated interference signal d(k), is derived from the same receiver that supplies the normal signal denoted y(k), and that such derivation involves some time-shift or delay. The aim is again to obtain an estimated interference signal d(k) that is maximally indicative of the noise component in the normal signal, but, while in the first embodiment shown in FIGS. 4A and 4B, this is achieved by an independent receiver of the interference (reference) signal r(k), the principle used in these additional embodiments is to obtain r(k) from y(k) itself, e.g., by delaying the signal y(k) from one and the same receiver.

As already explained and as depicted in FIG. 7, the useful signals of locating systems are generally characterized by relatively narrow pulses that repeat regularly. Thus there are, in between the pulses, interval periods, in which no useful signal energy is transmitted. On the other hand, interfering signals are usually continuous and in any case may transmit energy also during these interval periods.

Thus, one set of embodiments uses the interval periods in which no useful signal pulse is expected for training the adaptive filter. Another uses the interval periods in which no useful signal pulse is expected to predict the estimated interference signal to use when the useful signal is present.

As a first example, in the case of a timing signal, transmitted by IR pulses, the entire interval between successive IR pulses may be considered as empty of useful signal. This is a suitable time for obtaining an estimate of the interference signal, e.g., by predicting the interference signal.

For another example and with reference to FIG. 7, for the case of an ultrasound locating signal, we may define for each measuring cycle a period of a sensing window, only during which a pulse may be expected at the receiver. This window, which represents the range of propagation times for all possible locations in the active area of the movable device, begins shortly after a timing pulse, e.g., the IR pulse, and ends a certain time before the next timing pulse. The time periods between successive sensing windows are guaranteed to be free of useful signal energy. All such empty periods are referred to herein as adaptation windows. Line 4 of FIG. 7 illustrates adaptation windows in the case of an ultrasound receiver.

It is to be noted that, in certain systems, adaptation windows could be widened, based on the continuity of position of the movable pointing device; since the reception times of successive pulses is then predictable within a range, e.g., a range proportional to the device's maximum speed. The sensing window could then be narrowed accordingly and the adaptation window could be widened commensurately.

In different embodiments, other characteristics of the interfering signals may be assumed. These assumptions include:

(a) Interference signals mainly contain a single frequency or frequencies within a very narrow band. Such a range is, at least after appropriate filtering, close to the carrier frequency of the useful signal.

(b) the signal is essentially stationary, i.e. varies relatively slowly, if at all, in frequency or amplitude.

Owing to these characteristics it is particularly practical to generate an estimated interference signal, to serve for noise reduction in a received signal during any given period, that is based on, or derived from, the same signal some time earlier, i.e., a delayed version of the signal. The estimated interference signal can thus also be regarded as a prediction ("a predicted estimate") of the noise or interference component. Application of this principle in two specific embodiments will now be described.

Figure 5A:
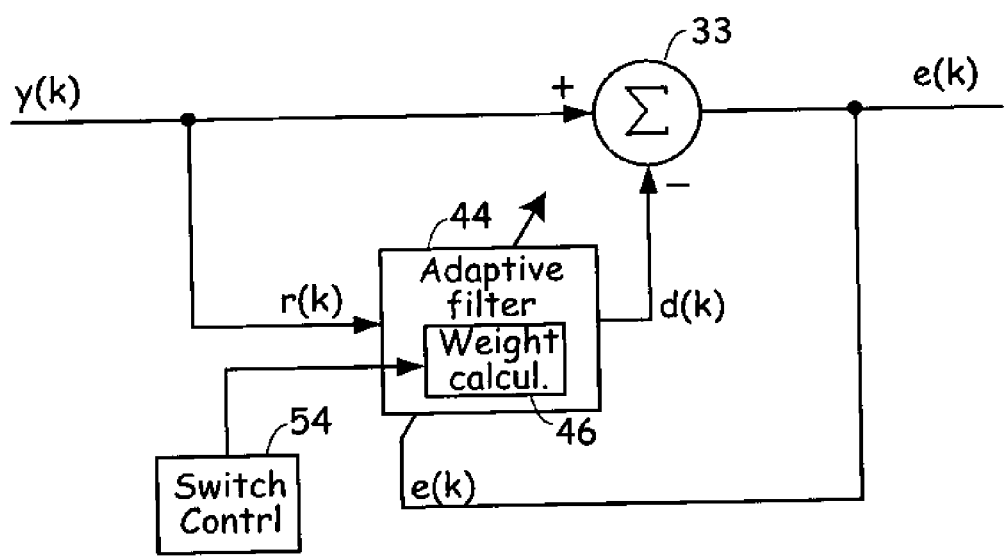
FIG. 5 is a block diagram of additional digital processing of a received signal according to a second embodiment of the invention.

FIG. 5A depicts schematically a second embodiment of the invention, which is a first version based on the time shift principle discussed above. It is similar to that of FIG. 4A in that it includes a summing device 33, whose one input is fed the normal received signal denoted y(k) and whose other input is fed the output of an adaptive filter 44, in this embodiment preferably including a FIR filter. Again, there is an adaptation loop from the output of the summing device 33, through an adaptive weight calculator 46, to the weights of the adaptive filter 44. However, unlike the embodiment of FIG. 4A, the input to the filter 44 is taken from the same received signal y(k) that is fed to the summing device 33. A switch control 54 continuously determines adaptation windows, based on information received from the system, such as occurrence of timing pulses and, optionally, of received locating pulses. The switch control is coupled to the adaptive filter and determines when adaptation may and may not occur.

Figure 5B:
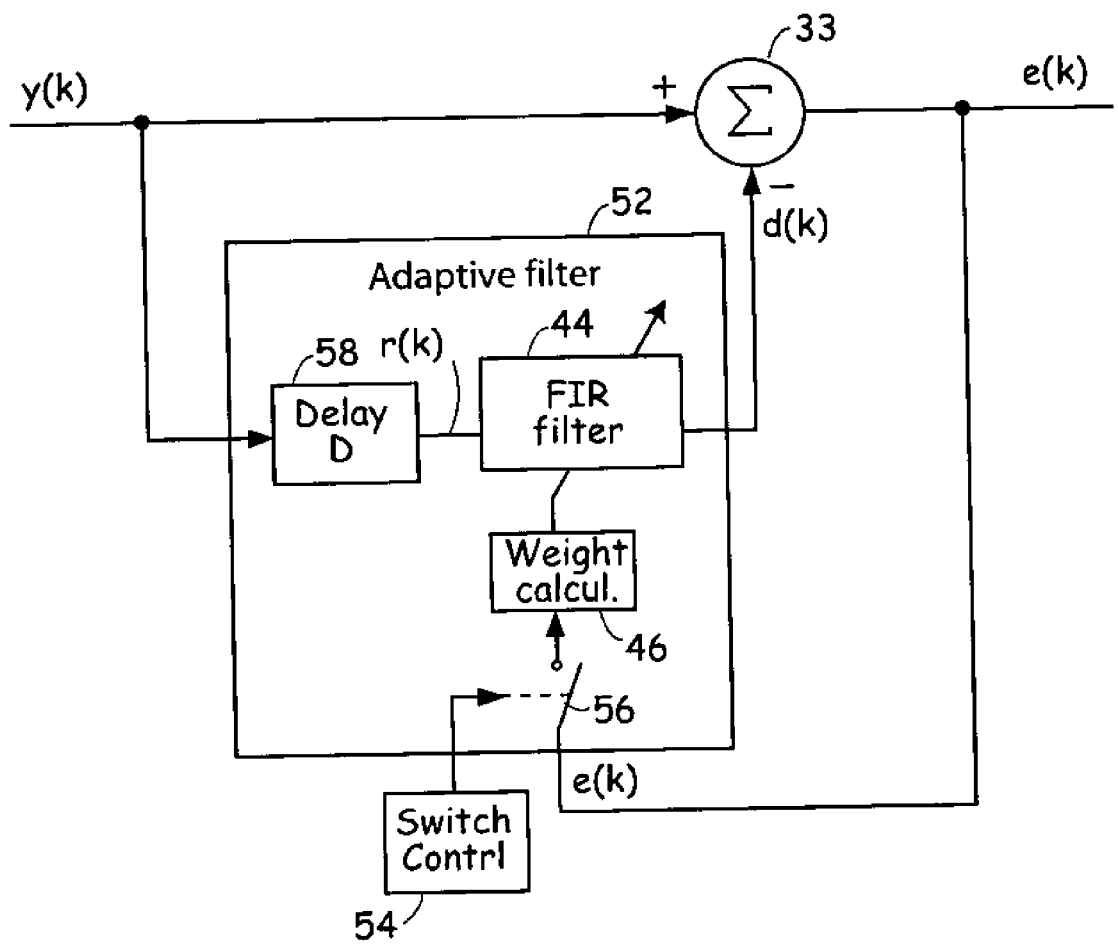

FIG. 5B shows one implementation of the embodiment of FIG. 5A. The interference signal is adaptively filtered by a FIR adaptive filter 44 of the adaptive filter unit 52 by passing the input received signal y(k) through a delay module 58 that delays the input by an amount D time sample units. The switch controller 54 is shown in FIG. 5B as controlling a switch 56, which opens or closes the adaptation loop depending on whether there is or is not adaptation. The adaptation method, realized in adaptive weight calculator 46, is preferably similar to that stated for the first embodiment, except that the term r(k) representing the separately received interference signal samples is here equal to y(k−D), i.e. the received signal y(k) after a delay of D sample time units. The adaptive FIR filter 44 is realized in one embodiment as shown in FIG. 4B.

Operation of this second embodiment of FIG. 5B is as follows: The switch control 54 repeatedly determines adaptation windows, based on information received from the system, such as occurrence of timing pulses and, optionally, of received locating pulses. During each adaptation window it causes the loop switch 56 (for the version of FIG. 5B) to be closed, thus enabling the adaptation loop. During this period, the delayed version of the received signal passes through the filter 44 and, as modified by the filter, is applied to the summing device 33, where it is subtracted from the currently received signal. The difference signal is applied to the adaptive weight calculator 46, which modifies the weights of the filter so as to reduce the difference signal at the next iteration, e.g., the next sample time. Since, during the adaptation window, the received signal presumably contains only the interference component, the effect of the iterative adaptation will be to reduce the difference to zero, or nearly so; in other words, when the filter becomes fully adapted, its output signal will nearly equal the noise component in the currently received signal. At the end of the adaptation window the switch 56 opens and the weights of the FIR filter remain fixed at their last values. Received signal continues to be fed through both inputs to the summing device 33, where the two versions continue to be subtracted from each other. Now when a pulse of the useful signal is received, it is immediately applied to the positive input of the summing device, while the negative input is fed an adaptively filtered earlier received signal, which does not yet contain the pulse. Because of the assumed stationarity of the interference, the filtered signal continues to be a close approximation of the noise component in the currently received signal and thus fully cancels it in the summing device, resulting in the output (difference) signal to consist almost entirely of the useful component alone.

It is noted that the value of the delay, D, and the timing and length of the adaptation period, as well as the factor μ in the adaptation formula, are parameters that may be chosen to optimize operation, based on system characteristics and signal levels. It is also again noted that the blocks "delay" 58, "FIR filter" 44, "adaptive weight calculator" 46 and "switch control" 54 in FIG. 5B collectively constitute, in effect, any one of the blocks generically named "Noise Estimator" 35 in FIG. 3.

Figure 6:
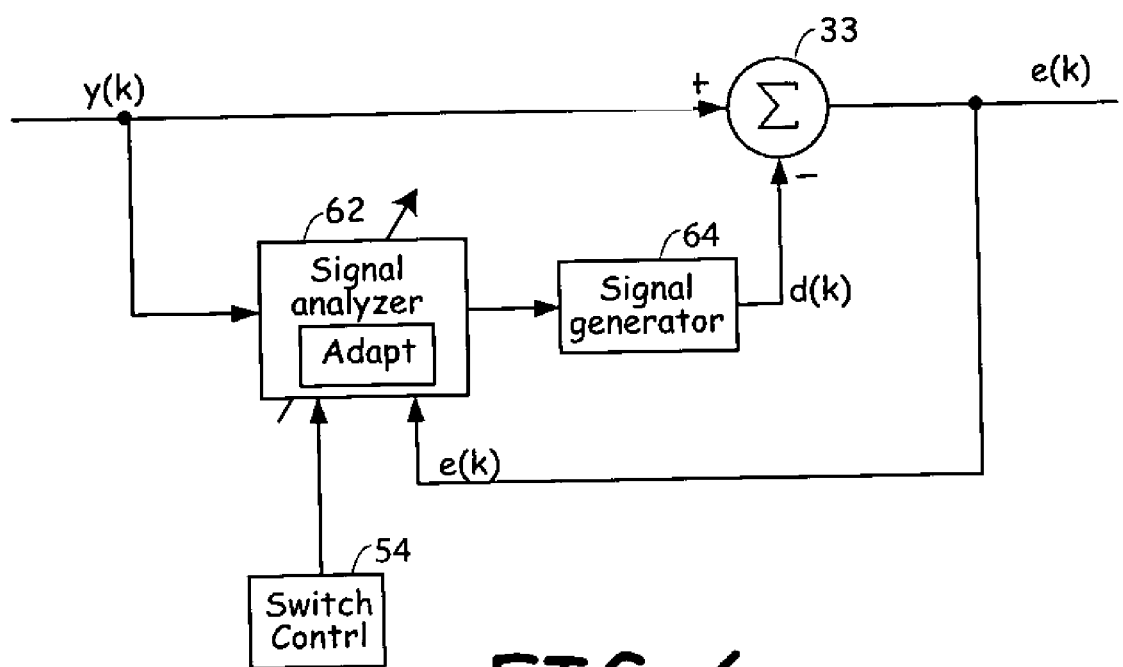
FIG. 6 is a block diagram of the additional digital processing of a received signal according to a third embodiment of the invention.

Reference is now made to FIG. 6, which depicts schematically a third embodiment of the invention, which is a second embodiment based on the time shift principle discussed above. It is particularly suitable for cases in which the interfering signal, after any input filtering, is comprised essentially of a single or a small number of frequencies and, again, varies relatively slowly. It consists, in addition to the summing device 33, of an adaptive analyzer 62, a signal generator 64 and a switch control 54. The case of the input, after appropriate filtering, including essentially one main frequency is described. The analyzer 62 is fed the received signal and functions to continuously determine its frequency, phase, e.g., phase relative to a given time base, and amplitude, as well as their respective rates of change. It passes the measurements on to the signal generator 64, which generates a sinusoidal signal accordingly and feeds it to the summing device 33, where it is subtracted from the current received signal. In one embodiment, the combination of the analyzer and signal generator is implemented as digital phase locked loop circuit, well known in the art. The analyzer is active only during adaptation windows, as defined above. Toward the end of an adaptation window the analyzer calculates the three parameters for a certain time ahead, akin to the delay of the second embodiment, based on the measured rates of change, and these parameters are used by the signal generator during the ensuing sensing window. The switch control module 54 controls this cyclical operation of the analyzer. The effect of operation of this embodiment is very similar to that of the second embodiment.

For the case that the interfering signal contains a plurality of distinct frequencies, the analyzer 62 may be modified to analyze each of the frequencies and to supply corresponding sets of parameters; similarly, the signal generator 64 may be modified to generate a plurality of sine waves accordingly.

In an alternate embodiment, to use an adaptive filter based on the LMS or other derivative method, a FIR filter whose weights are computed according to a least squares criterion is used. The weights are calculated so as to minimize the least squared sum of a number M of outputs. Thus, denoting by $\underline{e}(k)$ is the vector of the M error signals, i.e., $$\underline{e}(k)=[e(k), e(k-1), \ldots, e(k-M+1)]^T,$$

where $[\ ]^T$ represents the matrix transpose, the criterion is to determine the weight vector $\underline{w}$ for the FIR filter that minimizes the sum of the squares of e(k)'s, being $\Sigma_{i=0\ to\ M-1}[e^2(k-i)]=\underline{e}(k)\cdot\underline{e}(k)$.

Recall $\underline{e}(k)=\underline{y}(k)-\underline{w}\cdot\underline{r}(k)$, where $$\underline{y}(k)=[y(k), y(k-1), \ldots, y(k-M+1)]^T$$

$$\underline{r}(k)=[r(k), r(k-1), \ldots, r(k-M+1)]^T.$$

For the moment, assume the weights do not change in time. This equation is representable as a set of M linear equations, which in turn is representable as a linear matrix equation. Denoting by A(k) the M by M matrix of the equation for the M values k=0, 1, ..., M−1, those in the art will know that the least squares solution that minimizes $\underline{e}(k) \cdot \underline{e}(k)$ is obtained by using the pseudoinverse of the matrix, i.e., $$(A^T A)^{-1} A^T.$$

In one embodiment, the weights are determined at a time when it is known that the reference signal r(k) input into the filter is known not to contain components of the desired signal. This least squares FIR filter method is applicable to both the method that uses a separate reference signal receiver, and for the method wherein the reference signal is a version of the input signal when the desired signal is known not to be present.

For example, in one embodiment, when r(k) is a delayed version of y(k), and $$d(k)=w(125)y(k-125)+w(123)y(k-123)+w(121)y(k-121)+w(119)y(k-119),$$

then $$y(k)-w(125)y(k-125)+w(123)y(k-123)+w(121)y(k-121)+w(119)y(k-119)=e(k),$$

then the equations to solve for w(125), w(123), w(121), and w(119) are $$A(k)\underline{w}=\underline{y}(k), \text{ where, for M values}$$

$$A(k) = \begin{bmatrix} y(k-125) & y(k-123) & y(k-121) & y(k-119) \\ y(k-125-1) & y(k-123-1) & y(k-121-1) & y(k-119-1) \\ y(k-125-2) & y(k-123-2) & y(k-121-2) & y(k-119-2) \\ \vdots & \vdots & \vdots & \vdots \\ y(k-125-M+1) & y(k-123-M+1) & y(k-121-M+1) & y(k-119-M+1) \end{bmatrix}$$

$$\underline{w} = \begin{bmatrix} w(125) \\ w(123) \\ w(121) \\ w(119) \end{bmatrix}, \text{ and } \underline{y}(k) = \begin{bmatrix} y(k) \\ y(k-1) \\ Y(k-2) \\ \vdots \\ y(k-M+1) \end{bmatrix}.$$

Each element of $(A^T A)^{-1}$ and of $A^T \underline{y}(k)$ may then be computed as sums. The linear equations may then be solved using many numerical methods, e.g., Gaussian elimination.

In an improved least squares version, the weights of the filter are taken as a moving average of the last few corresponding weights and the newly calculated weight, such that the weights are updated from time to time.

For example, in one version, $$\begin{bmatrix} w(125) \\ w(123) \\ w(121) \\ w(119) \end{bmatrix} (\text{new}) = \begin{bmatrix} w(125) \\ w(123) \\ w(121) \\ w(119) \end{bmatrix} (\text{previous}) + \begin{bmatrix} w(125) \\ w(123) \\ w(121) \\ w(119) \end{bmatrix} (\text{calculated}).$$

The embodiments disclosed herein are in terms of digital techniques and are operative on digitized signals. As noted above, similar analog embodiments are generally possible but digital ones are preferable, as they are more practicable. Specific realizations may be any ones known in the art, including special-purpose digital circuits, assembled logic modules and a set of instructions in a programmable digital processor or processing system, as well as any combination between them. Programmable digital processors may include, in particular, so-called digital signal processors (DSP). In the case of a programmable processor it may be advantageous to realize the modules of the present invention within the same processor that serves for realizing the locator.

Figure 8A:
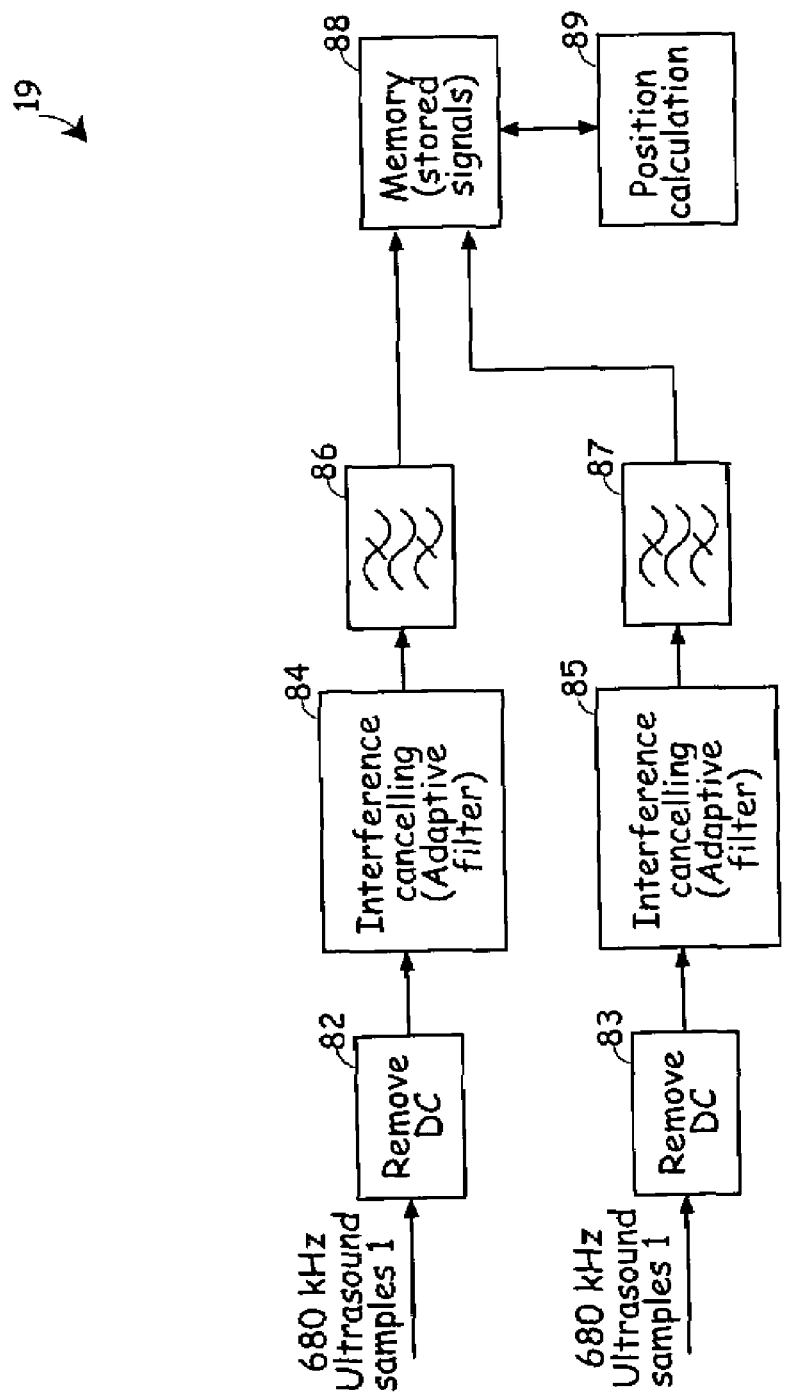
FIG. 8A shows a simplified block diagram of one embodiment of the invention that performs interference reduction using adaptive filers on only the ultrasonic received signals.

One embodiment of the invention performs the interference reduction using the adaptive filers on only the ultrasonic received signals. Such an embodiment is shown in simplified block diagram form in FIG. 5A. The general architecture used is that shown in FIG. 1C. The ultrasound and the IR are all samples with an ADC at 680 KHz, i.e., with a period of about 1.47 µs. Because the IR pulses are received before the ultrasound pulses, only one ADC is used to digitize both the IR and one of the ultrasound channels, with a switch switching over to the ultrasound channel as soon as the ultrasound pulse has been sent. Referring to FIG. 8A, the DSP memory has a set of IR received samples and two sets of ultrasound received samples, and processes these accordingly. In one embodiment, adaptive interference reduction is carried out on only the ultrasonic samples. Note that one alternate embodiment includes interference reduction also for the IR channel, while yet another alternate embodiment includes interference reduction for the IR channel, but not for the ultrasound received signals.

In one embodiment, the samples from each of the ultrasound receivers are subject to DC removal (clamping) by DC removal units 82 and 83 using methods known in the art. These DC-removed samples are then subject to interference reduction using the structures 84 and 85, that may be implemented as described above. After interference reduction, the signals are each subject to a bandpass filter 86 and 87 for the frequency range of interest. In one embodiment, the ultrasound transducers on the transmitting pointing device and the matching receives have a resonant frequency of 40 kHz, so that the bandpass filters 82 and 83 are centered around this frequency. The pulse rate is about 70 pulses per second. The signals after filtering are stored in memory 88 for further processing, e.g., by position calculation method (shown as block 89) as described in principle above, and in one embodiment, as in the Wood, et al. incorporated herein by reference U.S. Pat. No. 6,335,723 and in another embodiment, as in the Wood, et al. incorporated herein by reference U.S. Pat. No. 6,414,673.

FIG. 8B shows one embodiment of the adaptive interference reductions units 84 and 85, e.g., unit 84 for the first ultrasonic signal. The adaptive filter includes a tapped delay line that provides a delay of 121 units. The FIR filter whose coefficients are adaptively modified are of taps 121, 123, 125, and 127, thus are two samples apart. The weighting and add accumulation calculations are adaptively adjusted by weight calculator 46. The switch control 54, together with switch 56, ensure that the adapting only occurs when we know there is no ultrasound signal, but only interference present.

As will be appreciated by those skilled in the art, the present invention may be embodied as a method, an apparatus such as a special purpose computing apparatus or a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device, such as a diskette or a hard disk, or an optical storage device such as a CD-ROM.

It will be understood that the steps of methods discussed are performed in one embodiment by an appropriate processor (or processors) of a processing system (e.g. computer) executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "an embodiment" means that a particular feature, structure or characteristic described in connection with the embodiment is included in at least one embodiment of the present invention. Thus, appearances of the phrases "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method for determining the location of a pointing device in the vicinity of a set of receivers able to receive one or more locating signals transmitted through air near a surface, the method comprising:
   (a) transmitting one or more ultrasound pulses and one or more electromagnetic signal pulses to or from the pointing device when the pointing device is near the surface, and as a result:
      (a1) receiving at one or more ultrasound receivers a respective ultrasound signal as a result of a transmitted ultrasound pulse propagating through air between the respective ultrasound receiver and the pointing device, or
      (a2) receiving at an electromagnetic signal receiver a respective electromagnetic signal as a result of a transmitted electromagnetic pulse signal, or
      (a1a2) both receiving at one or more ultrasound receivers the respective ultrasound signal and receiving at the electromagnetic signal receiver the electromagnetic signal,
   wherein at least one of the received signals includes a respective interfering signal;
   (b) for at least one of the received signals that may include a respective interfering signal, determining a respective estimated interference signal indicative of the respective interfering signal included in the at least one signal received in step (a);
   (c) for at least one of the received signals that includes a respective interfering signal, determining a signal indicative of the difference between the respective signal received in step (a) and the respective estimated interference signal determined in step (b); and
   (d) using the signal determined in step (c) to compute the location of the pointing device on or near the surface.

2. A method as recited in claim 1, wherein step (b) includes for the at least one received signals that includes the respective interfering signal, receiving a respective reference correlated with the respective interfering signal, and filtering the respective reference signal using a respective filter to produce the respective estimated interference signal.

3. A method as recited in claim 2, wherein each respective filter is respective adaptive filter.

4. A method as recited in claim 2, wherein each respective filter is a respective filter defined by a set of one or more filter parameters, the set selected from a plurality of sets according to a selection criterion.

5. A method as recited in claim 1, wherein step (b) includes for the at least one received signals that includes the respective interfering signal, forming a respective reference signal from the respective signal received in step (a) at a time when the signal corresponding to a respective transmitted pulse is not expected to be included in the respective received signal, and filtering the respective reference signal.

6. A method as recited in claim 5, wherein the forming of the respective reference signal includes delaying the respective signal received in step (a).

7. A method as recited in claim 5, wherein each respective filter is a respective adaptive filter, and the adapting by the respective adaptive filter uses the respective reference signal when such respective reference signal is known not to include the signal corresponding to a respective transmitted pulse.

8. A method as recited in claim 5, wherein said determining of an estimated respective interference signal includes filtering the respective received input with a respective adaptive filter that adapts a respective set of filter parameters, and wherein adapting of the respective filter parameters only occurs when the signal corresponding to a respective transmitted pulse is not expected to be included in the respective received signal.

9. A method as recited in claim 8, wherein step (b) occurs for the ultrasound signals emitted by the pointing device, wherein the interference signal includes an interfering signal in the frequency range of the ultrasound pulses, wherein the electromagnetic signal pulses are emitted as timing pulses for the ultrasound pulses, and wherein the timing of when to carry out adapting uses the timing pulses.

10. A method as recited in claim 9, wherein said determining a respective estimated interference signal includes predicting the respective estimated interference signal from said signal received via the air between the pointing device and the respective receiver during some time preceding a corresponding one of said given time periods.

11. A method as recited in claim 1, wherein said step (b) includes for the at least one of the received signals that includes the respective interfering signal, determining the respective estimated interference signal from the respective received signal, and wherein said step (b) includes delaying the respective received signal to produce a respective delayed version of the respective received signal, and determining the respective estimated interference signal from the respective delayed version.

12. A method as recited in claim 11, wherein said step (b) further includes for the at least one of the received signals that includes the respective interfering signal, adaptively filtering said respective delayed version by a respective adaptive filter, each respective adaptive filter carrying out a respective adaptation process.

13. A method as recited in claim 12, wherein said respective adaptation process is halted substantially prior to performing step (d) prior to when it is expected that the respective received signal includes a signal corresponding to a respective transmitted pulse.

14. A method as recited in claim 12, wherein said respective adaptation process uses a respective error signal indicative of the difference between the respective estimated interference signal and the respective signal concurrently received via the air.

15. A method as recited in claim 12, wherein said respective adaptation process uses the LMS method or a derivative thereof for the respective adaptation process using a respective error signal indicative of the difference determined in step (c).

16. A method as recited in claim 1 wherein at least one of the received signals includes the ultrasound pulses, wherein the interference signal includes an interfering signal in the frequency range of the ultrasound pulses.

17. A method as recited in claim 1, wherein step (b) occurs for the ultrasound signals emitted by the pointing device, wherein the electromagnetic signal pulses are emitted as timing pulses for the ultrasound pulses, and wherein the interference includes interference at a frequency within the frequency range of the electromagnetic radiation.

18. A method as recited in claim 1, wherein the ultrasound and electromagnetic signal pulses are transmitted from respective transmitters attached to the pointing device.

19. A method as recited in claim 1, wherein the receiving is by two or more ultrasound receivers or electromagnetic signal receivers or their combination thereof in fixed relative positions to the surface, and wherein steps (b), (c), and (d) are performed with respect to at least two of said respective receivers.

20. A method as recited in claim 1, wherein the signal corresponding to a respective transmitted pulse is received by a respective sensor attached to the pointing device.

21. A method as recited in claim 20, wherein the transmitting is by one or more ultrasound and/or electromagnetic pulse transmitters in fixed positions relative to the planar surface, each transmitter sending respective locating signals, and wherein steps (b), (c), and (d) are performed with respect to at least two of the received signals.

22. An apparatus to determine the location of a pointing device on or near a surface in the vicinity of a set of receivers able to receive one or more locating signals transmitted through air, the apparatus comprising:
   a pointing device;
   at least one ultrasound transmitter configured to transmit ultrasound pulses through the air near the surface;
   an electromagnetic signal transmitter configured to transmit electromagnetic signal pulses;
   one or more ultrasound receivers to receive a respective ultrasound signal transmitted from the at least one ultrasound transmitter; and
   an electromagnetic signal receiver to receive a respective electromagnetic pulse signal transmitted from the pointing device,
   wherein the respective receivers may receive in addition respective interfering signals,
   the apparatus further comprising:
      for at least some of the receivers, a respective filter accepting a respective reference signal likely to be correlated with the respective interfering signal, the output of the respective filter generating a respective estimated interference signal indicative of the respective interfering signal included in the respective signal received at the respective receiver;
      a respective subtractor coupled to the output of the respective filter and to the output of each of the at least some receivers to determine a respective signal indicative of the respective difference between the respective received signal and the respective estimated interference signal; and
      a location determiner coupled to the output of the each subtractor and using the respective signal indicative of the respective difference to compute the location of the pointing device on a or near the surface.

23. An apparatus as recited in claim 22, wherein the respective reference signal is determined from the respective signal received by the respective receiver at a time when the signal corresponding to a respective transmitted pulse is not expected to be included in the respective received signal.

24. An apparatus as recited in claim 23, wherein the respective reference signal is formed by a process that includes delaying the respective signal received by the respective receiver.

25. An apparatus as recited in claim 23, wherein each respective filter is a respective adaptive filter, and the adapting by the respective adaptive filter uses the respective reference signal when such respective reference signal is known not to include the signal corresponding to a respective transmitted pulse.

26. An apparatus as recited in claim 23, wherein said respective filter is a respective adaptive filter that adapts a set of respective filter parameters, the adapting of the respective filter parameters only occurring when the signal corresponding to a respective transmitted Pulse is not expected to be included in the respective received signal.

27. An apparatus as recited in claim 26, wherein the at least one ultrasound transmitter and the electromagnetic signal transmitter are on the pointing device such that the ultrasound pulses are periodically emitted by the pointing device, wherein the one or more ultrasound receivers include at least two ultrasound receivers, wherein the interference signal received by each ultrasound receiver includes an respective interfering signal in the frequency range of the ultrasound pulses, wherein the electromagnetic signal pulses are emitted from the pointing device as timing pulses for the ultrasound pulses, and wherein the timing of when to carry out adapting of the respective filter parameters uses the timing pulses.

28. An apparatus as recited in claim 27, wherein said respective filter determines a respective estimated interference signal by a process that includes predicting the respective estimated interference signal from said respective signal received via the air between the pointing device and the respective receiver during some time preceding a corresponding one of said given time periods.

29. An apparatus as recited in claim 26, wherein the at least one ultrasound transmitter are on the pointing device such that the ultrasound pulses are periodically emitted by the pointing device, wherein the one or more ultrasound receivers include at least two ultrasound receivers, and wherein the interference signal received by each ultrasound receiver includes an respective interfering signal in the frequency range of the ultrasound pulses.

30. An apparatus as recited in claim 22, wherein said respective filter is to determine the respective estimated interference signal from the respective received signal, and wherein said respective filter further includes a delay delaying the respective received signal to produce a respective delayed version of the respective received signal, such that the respective filter determines the respective estimated interference signal from the delayed version of the respective received signal.

31. An apparatus as recited in claim 30, wherein said respective filter includes a respective adaptive filter to adaptively filter said respective delayed version, each respective adaptive filter carrying out a respective adaptation process.

32. An apparatus as recited in claim 31, wherein said respective adaptation process is halted substantially prior to said location determiner computing the location of performing step using the respective signal indicative of the difference, such that the respective signal indicative of the difference used in the computing is prior to when it is expected that the respective received signal includes a locating signal.

33. An apparatus as recited in claim 31, wherein said respective adaptation process uses a respective error signal indicative of the difference between the respective estimated interference signal and the respective signal concurrently received via the air.

34. An apparatus as recited in claim 31, wherein said respective adaptation process uses the LMS method or a derivative thereof using a respective error signal indicative of the difference output by the respective subtractor.

35. An apparatus as recited in claim 22, wherein the at least one ultrasound transmitter and the electromagnetic signal transmitter are on the pointing device such that the ultrasound pulses are periodically emitted by the pointing device, wherein the electromagnetic signal pulses are emitted from the pointing device as timing pulses for the ultrasound pulses, and wherein the interference includes interference received by the electromagnetic signal receiver at a frequency within the frequency range of the electromagnetic radiation.

36. An apparatus as recited in claim 22, wherein the at least one ultrasound transmitter and the electromagnetic signal transmitter are attached to the pointing device.

37. An apparatus as recited in claim 22, wherein the wherein the at least one ultrasound transmitter include at least two ultrasound transmitters at different locations on or close to the surface, wherein the electromagnetic signal transmitter is on or close to the surface, and wherein the one or more ultrasound receivers and the electromagnetic signal receiver are attached to the pointing device such that the transmitted ultrasound pulses and the electromagnetic signal pulses are received by respective receivers attached to the pointing device.

38. An apparatus to determine the location of a pointing device in the vicinity of a set of receivers able to receive one or more locating signals transmitted through air close to a surface, the apparatus comprising:

a pointing device including an ultrasound transmitter configured to transmit ultrasound pulses and an electromagnetic signal transmitter configured to transmit electromagnetic signal pulses;

two or more ultrasound receivers at different locations at or close to the surface configured to receive a respective ultrasound signal transmitted from the pointing device and a respective interfering signal;

an electromagnetic receiver to receive a respective electromagnetic pulse signal transmitted from the pointing device and a respective interfering signal; and a processor programmed to carry out a method including:
accepting and filtering a respective reference signal likely to be correlated with the respective interfering signal, the respective filtering generating a respective estimated interference signal indicative of the respective interfering signal included in the respective signal received at each receiver;

accepting the respective signal received at each receiver and the output of the respective filtering operation, and subtracting the accepted signals to determine a respective signal indicative of the difference between the respective received signal and the respective estimated interference signal; and using each respective signal indicative of the difference to compute the location of the pointing device on a surface near the set of receivers.

* * * * *